United States Patent [19]

Gilbert et al.

[11] 4,249,990

[45] Feb. 10, 1981

[54] PROCESS FOR REMOVAL OF POTASSIUM VALUES FROM PULP MILL LIQUORS

[75] Inventors: Allan F. Gilbert, Thunder Bay; W. Howard Rapson, Scarborough, both of Canada

[73] Assignee: ERCO Envirotech Ltd., Islington, Canada

[21] Appl. No.: 26,204

[22] Filed: Apr. 2, 1979

[30] Foreign Application Priority Data

Apr. 19, 1978 [GB] United Kingdom ............ 15412/78

[51] Int. Cl.³ .................................................. D21C 11/04
[52] U.S. Cl. ............................................ 162/17; 23/302 R; 162/30 R; 162/30 K; 162/33; 423/DIG. 3
[58] Field of Search ............. 162/17, 29, 30 R, 30 K, 162/32, 33; 23/302 R; 423/207, DIG. 3

[56] References Cited

U.S. PATENT DOCUMENTS

3,365,278  1/1968  Kelly et al. .................. 23/302

3,909,344  9/1975  Lukes ........................... 162/30 R
3,950,217  4/1976  Reeve .......................... 162/DIG. 8

OTHER PUBLICATIONS

The Effluent-Free Bleached Kraft Pulp Mill, Rapson et al., Tappi, vol. 56, No. 9, 1973, pp. 112-115.

*Primary Examiner*—Peter F. Kratz
*Attorney, Agent, or Firm*—Sim & McBurney

[57] ABSTRACT

The accumulation of potassium values in a closed cycle pulp mill process usually using sodium hydroxide as a pulping chemical is prevented by removal of potassium values as potassium chloride by crystallization. A variety of procedures are described, including coprecipitation from white liquor with sodium chloride followed by separation of the codeposited salts, precipitation from white liquor separate from sodium chloride precipitation, and intermittent precipitation from green liquor with intermittent precipitation of sodium chloride from white liquor.

27 Claims, 14 Drawing Figures

PROCESS FOR REMOVAL OF POTASSIUM VALUES FROM PULP MILL LIQUORS

FIELD OF INVENTION

This invention relates to the removal of potassium salts from pulp mill liquors in a closed cycle bleached pulp mill operation.

BACKGROUND TO THE INVENTION

In a bleached pulp mill operation, in which bleach plant spent chemicals are introduced to the spent pulping liquor recovery and regeneration operation to eliminate the polluting effects of such chemicals, chemicals which normally are purged from the pulp mill by the discharge of bleach plant spent chemicals and which are not chemically affected by the recovery and regeneration operation accumulate in the recycling pulping liquor.

The major one of these accumulating chemicals is sodium chloride. Techniques for the removal of sodium chloride from the recovery and regeneration operation are described, for example, in U.S. Pat. Nos. 3,746,612, 3,950,217, 3,909,344, 3,986,923, 3,945,880 and 3,954,552.

Wood contains minor quantities of potassium salts, typically about 0.05 to 0.2% $K_2O$, corresponding to about 2 to 7 lbs. of potassium per ton of pulp (assuming a pulp yield of about 45%). Usually such quantities of potassium material are purged from the pulp mill by way of discharge of bleach plant chemicals, liquor spills, and furnace flue gases. However, with the implementation of the closed cycle concepts outlined above, and the tightening up of pulp mill procedures resulting in the elimination of liquor spills and the discharge of particulates with furnace gases, the potassium values tend to accumulate in the recovery and regeneration cycle.

SUMMARY OF INVENTION

The present invention is directed to procedures for the removal of potassium values from the recovery and regeneration procedure to prevent their accumulation and the possible detrimental effects of such accumulation. This is achieved by deposition of potassium chloride from the white liquor or, in one embodiment, from the green liquor.

In accordance with the present invention, there is provided a process of pulping cellulosic fibrous material including the steps of contacting the cellulosic fibrous material, usually wood, with a pulping liquor containing at least one active pulping chemical, preferably sodium hydroxide and sodium sulphide, separating pulped material from spent pulping liquor, and subjecting the spent pulping liquor to a furnacing step to provide a smelt containing chemicals reusable as and/or convertible into the active pulping chemicals.

The smelt is fractionated to provide (i) a liquor containing the at least one pulping chemical, (ii) solid sodium chloride and (iii) solid potassium chloride. The sodium chloride and potassium chloride to provided are obtained either on a continuous basis or on an alternating basis. The solid sodium chloride and solid potassium chloride are recovered.

DESCRIPTION OF PREFERRED EMBODIMENTS

Figure 1:
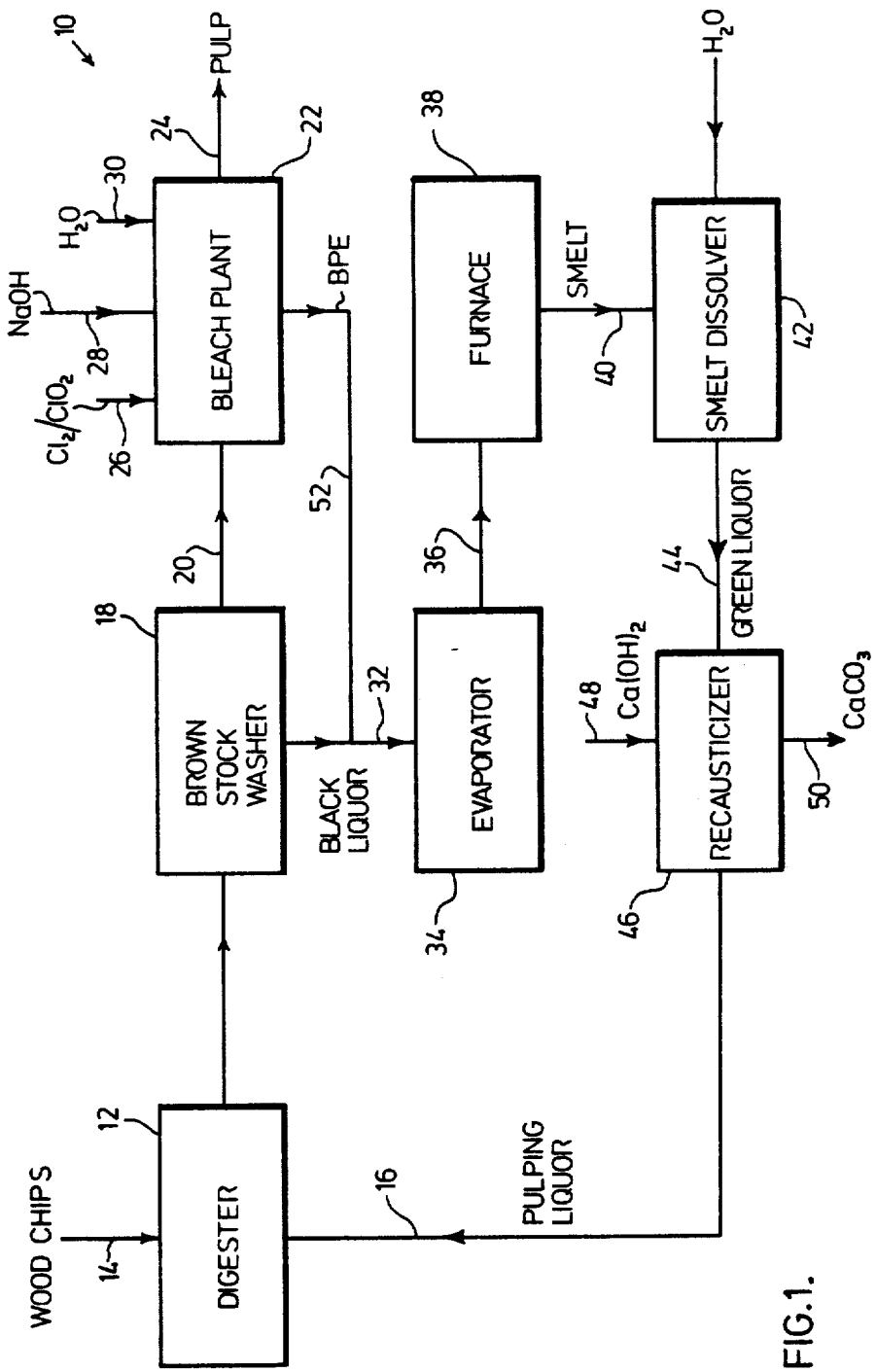
FIG. 1 is a schematic representation of a closed cycle pulp mill.

Referring first to FIG. 1, a closed cycle bleached pulp mill system 10 includes a digester 12 wherein wood chips, or other raw cellulosic fibrous material, fed thereto by line 14, are digested in recycled pulping liquor in line 16 to form a pulp. Where the Kraft pulping process is used, the pulping liquor contains sodium hydroxide and sodium sulphide as the active pulping chemicals.

The invention will be described with particular reference to the Kraft process, but it will be readily apparent that the principles of the invention may be used in conjunction with other pulping processes utilizing sodium hydroxide as a pulping chemical, such as, the soda process wherein sodium hydroxide is the sole pulping chemical.

The pulp is separated from spent pulping liquor (black liquor) and washed free from entrained liquor in a brown stock washer 18. The washed but otherwise untreated pulp then passes by line 20 to a bleach plant 22, wherein the pulp is subjected to bleaching, caustic extraction, and washing operations to form a bleached pulp of the desired brightness and purity in line 24.

Bleaching preferably is carried out using aqueous solutions of chlorine and chlorine dioxide fed by line 26 while caustic extraction is carried out using sodium hydroxide solution fed by line 28. Wash water is fed to the bleach plant 22 by line 30.

Any desired bleach plant treatment sequence may be used such as the D/CEDED sequence, wherein D/C refers to bleaching with an aqueous solution of chlorine dioxide and chlorine wherein the majority of the total available chlorine of the solution is provided by chlorine dioxide, D refers to bleaching with an aqueous solution of chlorine dioxide and E refers to caustic extraction with sodium hydroxide solution.

The black liquor from the brown stock washer is passed by line 32 to evaporators 34 and then by line 36 to a furnace 38, wherein the carbonaceous material is burned off and a smelt containing sodium sulphide and sodium carbonate is formed.

The smelt is passed by line 40 to a smelt dissolver 42. The resulting green liquor is passed by line 44 to a recausticizer 46 wherein the sodium carbonate is converted to sodium hydroxide by reaction with reburned lime fed by line 48.

After separation of the precipitated calcium carbonate by line 50 for regeneration of reburned lime, the resulting white liquor is recycled by line 16 to the digester 12.

Bleach plant effluents containing spent bleach plant chemicals and wash water are introduced to the black liquor recovery and regeneration cycle in place of conventional sewering and this introduction is represented schematically by line 52.

It is preferred for the bleach plant effluents to be introduced to the black liquor recovery and regeneration cycle using the procedures outlined in U.S. Pat. No. 4,039,372.

The introduction of the bleach plant effluents to the recovery and regeneration cycle by line 52 results in the introduction of the sodium chloride contained in the effluents to the recovery and regeneration cycle.

Some form of sodium chloride removal system, therefore, is associated with the system illustrated in FIG. 1, for example, a procedure as outlined in one of U.S. Pat. Nos. 3,746,612, 3,950,217, 3,986,923, 3,909,344, 3,945,880 and 3,954,552.

Figure 2:
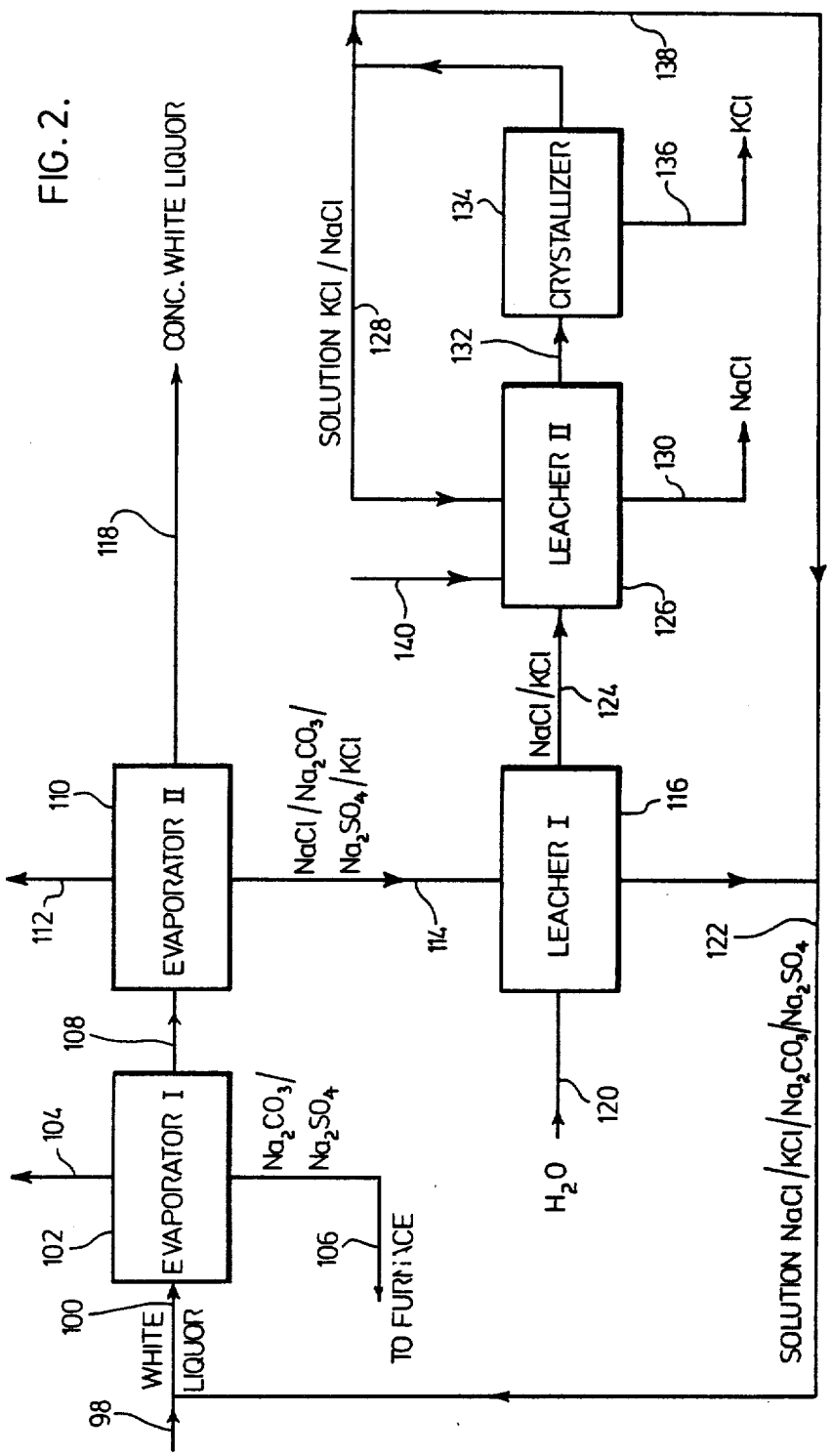
FIG. 2 is a schematic flow sheet illustrating one embodiment of the invention.

Turning now to the embodiment of the invention as set forth in FIG. 2, white liquor resulting from a recaustizer, such as recaustizer 46 in FIG. 1, is subjected to evaporative treatment.

The white liquor in line 100 resulting from recaustization contains not only the active pulping chemicals sodium sulphide and sodium hydroxide but also sodium chloride, potassium values and unregenerated pulping chemicals in the form mainly of sodium sulphate and uncausticized sodium carbonate, the potassium values arising mainly from the wood pulped in the digester. Minor quantities of other sodium- and sulphur-compounds may be present. The composition of the closed cycle Kraft mill white liquor in line 100 preferably is as follows:

Hydroxide: 2.2 to 2.8 molality
Sulphide: 0.25 to 0.75 molality
Chloride: 0.30 to 1.0 molality
Carbonate: 0.15 to 0.4 molality
Sulphate: 0.01 to 0.1 molality
Na+K: 3.3 to 6.3 molality This white liquor can attain a potassium molar ratio (K/K+Na) in the region of 0.14 to 0.25. The present invention is mainly concerned with systems for the removal of potassium chloride from white liquor having potassium molar ratios in this range.

The white liquor in line 100 is passed to a first evaporator 102 for evaporation to precipitate sodium sulphate, sodium carbonate and other precipitable dissolved materials other than sodium chloride and potassium chloride, preferably until the white liquor is substantially saturated with respect to sodium chloride and/or potassium chloride, i.e., up to the point where further concentration would result in precipitation of sodium chloride and/or potassium chloride.

The bulk of the sodium sulphate and sodium carbonate precipitate in this step, usually as anhydrous sodium carbonate and the double salt burkeite, $Na_2CO_3.2Na_2SO_4$. Generally, the white liquor is concentrated in the first stage evaporator 102 to about 26 to 32 wt.% $Na_2S+NaOH$.

The concentration of the white liquor in the first stage evaporator 102 preferably is carried out by boiling, if desired under a subatmospheric or superatmospheric pressure, in the temperature range of about 50° to about 120° C., more particularly about 75° to about 110° C. The evaporator 102 may be of any convenient form, such as, a single evaporation vessel or a plurality of interlinked evaporation vessels, as described in more detail in U.S. Pat. No. 3,950,217.

The water resulting from the evaporation in the evaporator 102 may be recovered by line 104 and utilized to provide part of the overall water requirement of the system.

The salts precipitated from the white liquor in the evaporator 102 are removed from the mother liquor by line 106 and, at least in part, are returned to the recovery and regeneration cycle at a location prior to the recovery furnace for consumption of sodium sulphate therein. Part of the removed salts may be passed directly to the green liquor.

It is preferred to pass part of the precipitated salts in line 106 to the furnace and the remainder to the green liquor to increase the relative proportion of sodium sulphate in the mixture in line 106. In this way, the quantity of sodium sulphate present in the white liquor may be controlled while the dead load of solids to the furnace in the form of sodium carbonate is decreased.

The partially concentrated white liquor is passed by line 108 to a second evaporator 110 for evaporation therein to form a solid precipitate. The evaporation of the partially concentrated white liquor in the second stage evaporator 110 is carried out by boiling, if desired, under a reduced pressure, at a temperature of about 30° to about 110° C., particularly at a temperature of about 50° to about 75° C. The water resulting from the evaporation is recovered by line 112 and may be used to provide part of the water requirement of the system.

The solid precipitate from the second stage evaporator 110 is removed therefrom by line 114 and is passed to a leacher 116. The solid precipitate removed by line 114 consists mainly of sodium chloride and potassium chloride contaminated with minor quantities of sodium carbonate and sodium sulphate, mainly as burkeite.

Depending on the concentration of the concentrated white liquor and the initial potassium molar ratio, the contamination of the mixture of potassium chloride and sodium chloride may be minor quantities of potassium sulphate and sodium sulphate, mainly as glaserite ($3K_2SO_4.Na_2SO_4$).

The concentrated white liquor resulting from the second evaporator 110 is passed by line 118 to provide at least part of the pulping liquor used in the digester, generally after suitable dilution.

Leach water is fed to the leacher 116 by line 120 to dissolve the sodium carbonate and sodium sulphate from the mixture of salts, along with some sodium chloride and potassium chloride, to form an aqueous solution of these materials and leave a purified mixture of sodium chloride and potassium chloride. The leaching operation generally is carried out at a temperature of about 5° to about 50° C., preferably about 15° to about 30° C.

The aqueous solution of sodium carbonate, sodium sulphate, sodium chloride and potassium chloride resulting from the leaching is recycled by line 122 to form the white liquor in line 100 by mixing with the white liquor in line 98 received from the recausticization. If desired, the aqueous solution may be recycled to the green liquor.

The solid mixture of sodium chloride and potassium chloride resulting from the leaching is removed by line 124 and represents a purge of both salts from the system, thereby preventing their unacceptable build up in the closed cycle pulp mill.

The aqueous solution of burkeite and/or glaserite resulting from the second leacher 158 is recycled by line 164 to the white liquor in line 100, or to the green liquor, if desired.

Figure 4:
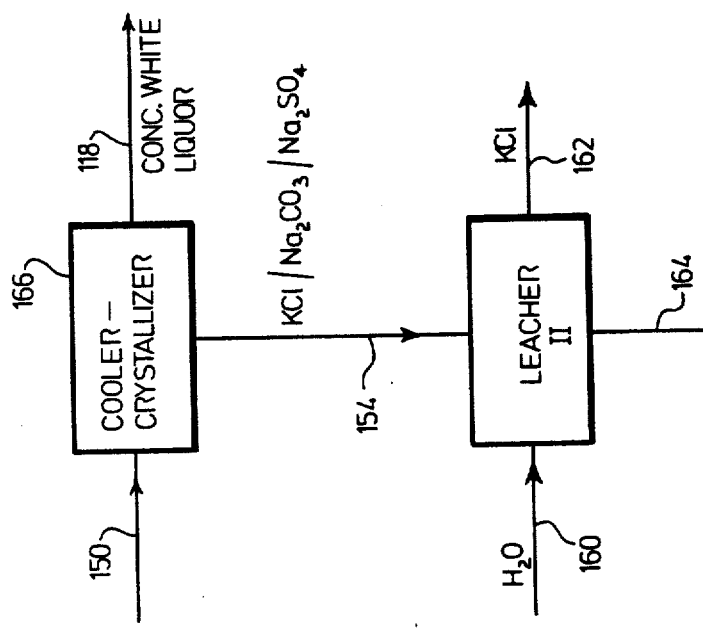
FIG. 4 is a schematic flow sheet illustrating a modification of the embodiment of FIG. 3.

As seen in FIG. 4, the third stage evaporator 152 may be replaced by a cooler-crystallizer 166 to achieve the deposition of potassium chloride, althrough evaporation also may be effected during the cooling. The choice of evaporation or cooling depends on the conditions of operation required for deposition of potassium chloride. Where the evaporator 152 is used, the temperature of operation is generally in the range of about 40° to about 80° C., preferably about 40° to about 70° C. Where the cooler 166 is used, the temperature of the white liquor in line 150 generally is cooled from a temperature of about 80° to about 110° C., preferably about 90° to about 110° C., generally to a temperature of about 20° to about 50° C., preferably about 20° to about 40° C.

Figure 5:
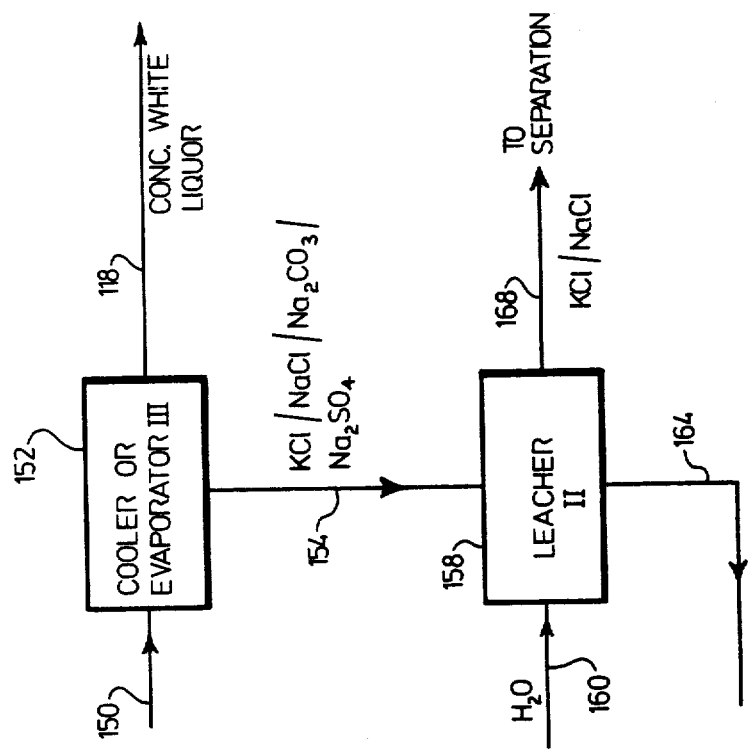
FIG. 5 is a schematic flow sheet illustrating a further modification of the embodiment of FIG. 3.

The conditions of operation of the second stage evaporator 110, the concentration of potassium and sodium values and the conditions of operation of the third stage crystallizer 152 or cooler 166 may be such as to cause deposition of sodium chloride along with the potassium chloride in the third stage evaporator 152, as shown in FIG. 5.

As in the case of embodiment of FIG. 2, where it is desired to recover sodium chloride and potassium chloride in substantially pure form, the leaching-crystallization separation technique described above in connection with FIG. 2 may be carried out on the mixture of potassium chloride and sodium chloride in line 168 resulting from the second leacher 158. Alternatively, the single leach process described below with respect to FIG. 8 may be employed on the mixture in line 154 to effect such separation.

Figure 3:
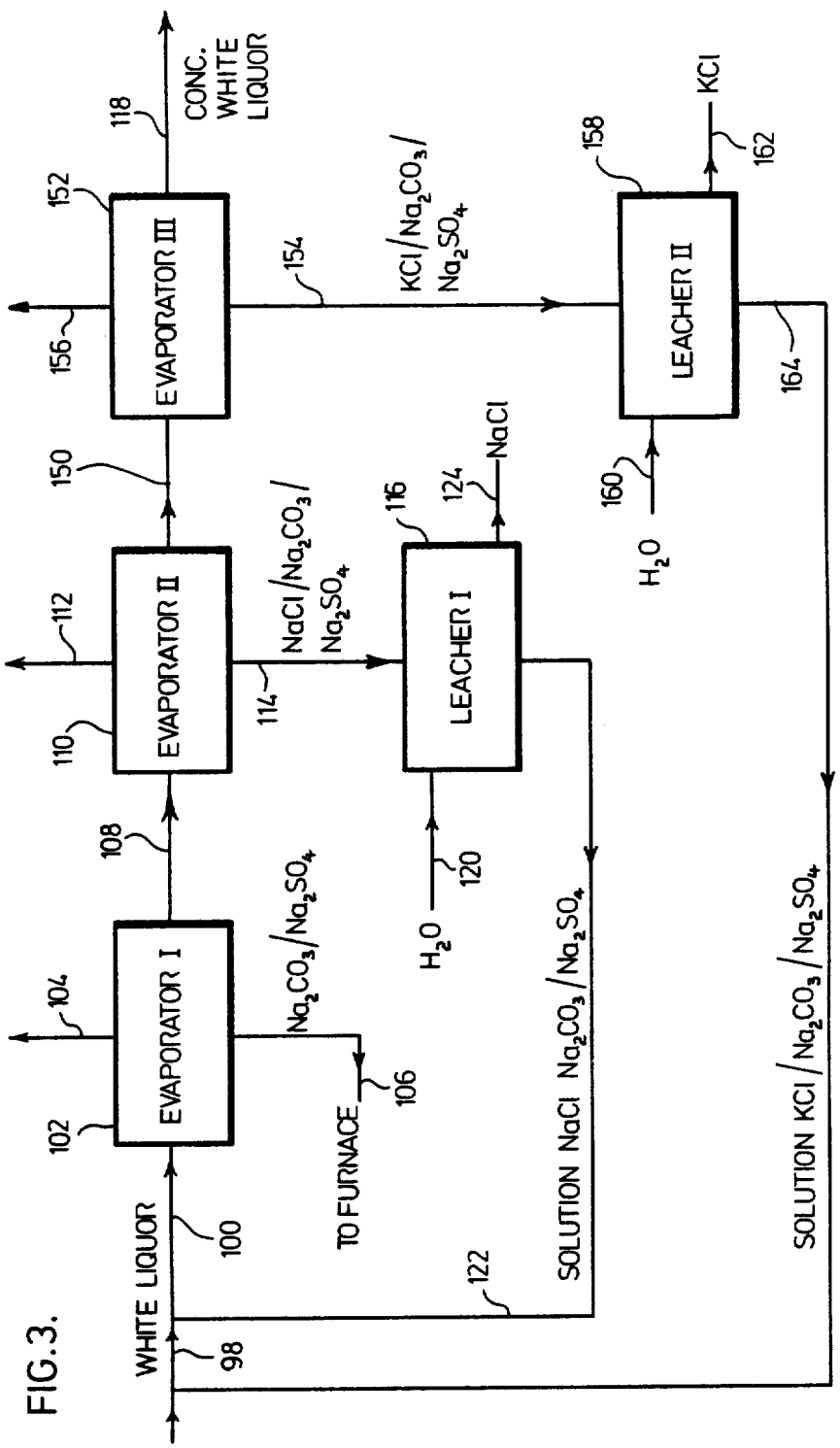
FIG. 3 is a schematic flow sheet illustrating a second embodiment of the invention.

The procedures of FIGS. 3 to 5 are continuous and the operation of the third stage evaporator or cooler is controlled to deposit only sufficient potassium chloride therein along with sufficient sodium chloride in the second stage evaporator to maintain a steady stage operation, i.e. a substantially steady state concentration of both sodium chloride and potassium chloride in the white liquor in line 100.

Figure 6:
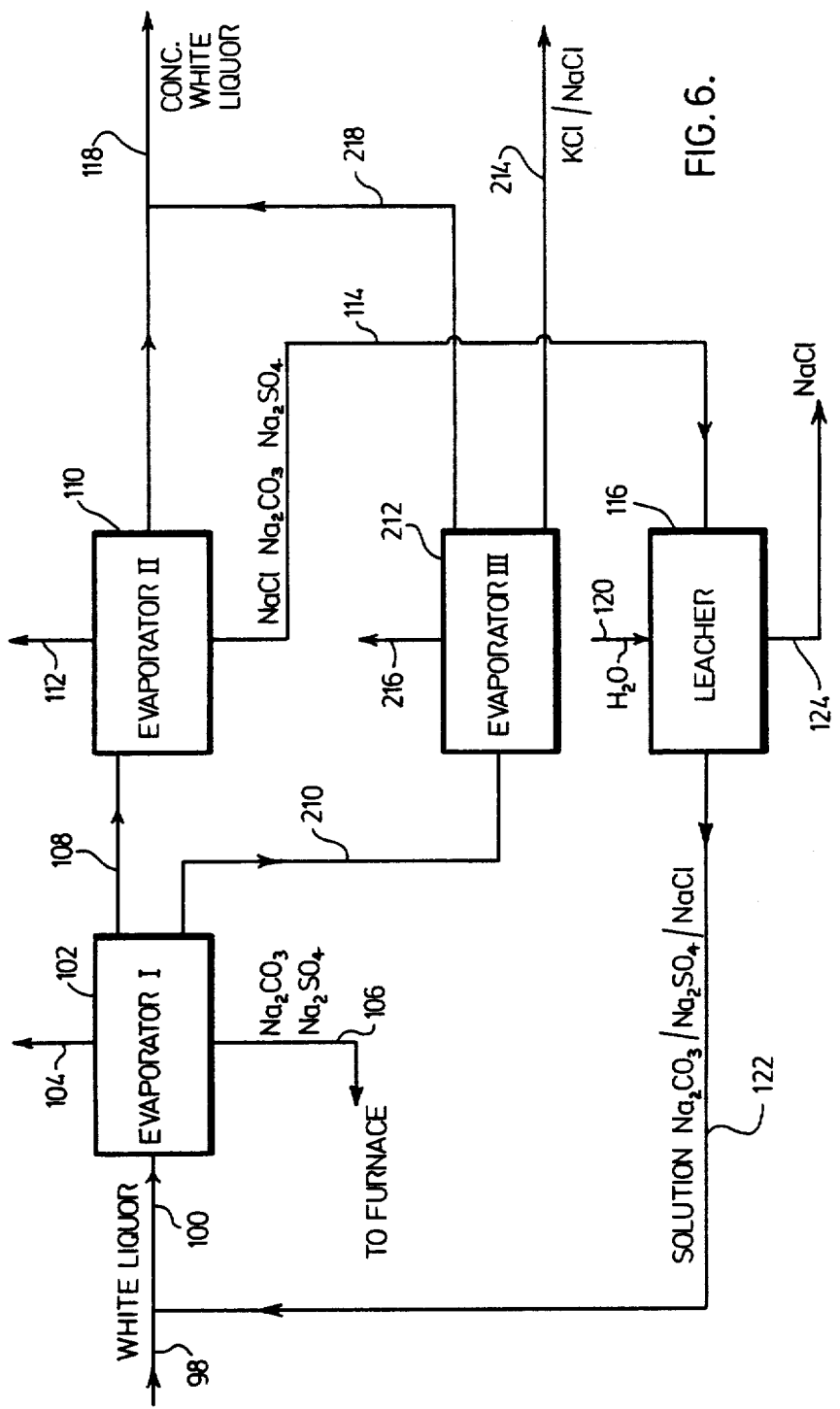
FIG. 6 is a schematic flow sheet illustrating a third embodiment of the invention.

In the embodiment of FIG. 6, only part of the partially concentrated white liquor formed in the first stage evaporator 102 is passed from the first stage evaporator 102 by line 108 to the second stage evaporator 110. In the second stage evaporator 110, the evaporation is carried out under conditions which inhibit the deposition of potassium chloride, under analogous conditions to those described for the operation of the second stage evaporator in connection with the embodiment of FIG. 3, and for the high temperature operation of the second stage evaporator in connection with the embodiment of FIG. 2, so that the solid mixture in line 114 is a mixture of sodium chloride, sodium carbonate and sodium sulphate, mainly as burkeite.

The remainder of the partially concentrated white liquor is fed from the first stage evaporator 102 by line 210 to a third stage evaporator 212 wherein that portion of the partially concentrated white liquor is boiled to deposit a mixture of potassium chloride and sodium chloride. The third stage evaporator generally is operated at a temperature of about 40° to about 60° C., preferably about 50° to about 60° C.

The deposited mixture of potassium chloride and sodium chloride is removed from the third stage evaporator 212 by line 214 while evaporated water is collected by line 216. The concentrated white liquor resulting from the third stage evaporation is forwarded by line 218 to join with the concentrated white liquor in line 118 for recycle to the digestion step.

The mixture of potassium chloride and sodium chloride recovered in line 214 may be contaminated with minor quantities of burkeite and/or glaserite which may be separated therefrom by leaching and recycle, in analogous manner to that described above in connection with FIG. 5.

The proportional split of white liquor from the first stage evaporator 102 between the second and third stage evaporators 110 and 212 depends on the quantity of potassium chloride required to be removed to maintain steady state conditions. Generally, the bulk of the white liquor passes to the evaporator 110 for sodium chloride removal and only a minor proportion passes to the evaporator 212 for potassium chloride removal due to the large excess of sodium chloride over potassium chloride required to be removed.

Figure 7:
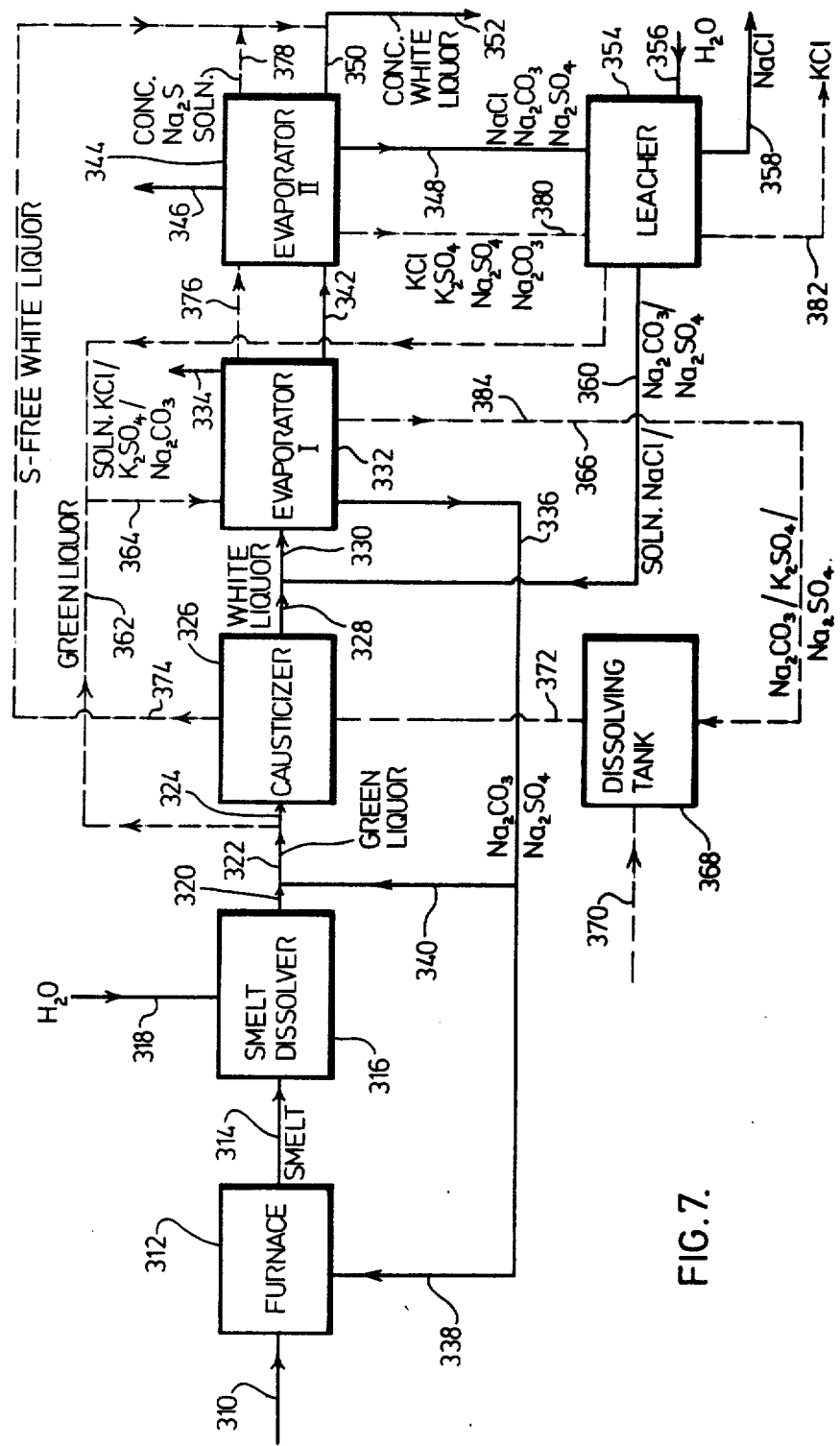
FIG. 7 is a schematic flow sheet illustrating a fourth embodiment of the invention.

Turning now to the embodiment of FIG. 7, there is illustrated therein an alternative cyclic system for the removal of sodium chloride and potassium chloride from the recovery cycle to that described above in connection with FIG. 2. In the present instance, sodium chloride and potassium chloride are separately removed in substantially pure form at different times of plant operation.

As seen in FIG. 7, concentrated black liquor from the black liquor evaporators is passed by line 310 to a furnace 312 to form a smelt containing sodium carbonate, sodium sulphide, sodium sulphate, sodium chloride and potassium values, as described above in connection with FIG. 1.

The smelt is passed by line 314 to a smelt dissolver 316 wherein it is dissolved in an aqueous medium fed by line 318. The resulting green liquor, after clarification to remove dregs, is fed by lines 320, 322 and 324 to a causticizer 326 wherein the bulk of the sodium carbonate values are converted to sodium hydroxide to result in white liquor in line 328.

The white liquor in line 328 is passed by line 330 to a first stage evaporator 332. In the first stage evaporator 332, the white liquor is boiled to cause deposition of sodium carbonate and sodium sulphate therefrom, the evaporated water being collected by line 334. The evaporation of the white liquor in the first stage evaporator 332 is carried out under the same conditions as described above in connection with the operation of the first stage evaporator 102 in the embodiment of FIG. 2 or 3, preferably until the white liquor is substantially saturated with respect to sodium chloride.

The deposited mixture of sodium carbonate and sodium sulphate is passed by lines 336 and 338 to the furnace 312 for consumption of sodium sulphate therein. Alternatively, part only of the mixture in line 336 is passed by line 338 to the furnace 312 while the remainder of the mixture in line 336 is passed by line 340 to the green liquor in line 320. The split recycle of the mixture of sodium carbonate and sodium sulphate to the furnace in line 312 and the green liquor in line 320 is the preferred manner of recycle of this mixture for the reasons discussed above in more detail in connection with the recycle of the mixture in line 106 in FIGS. 2 and 3.

The partially concentrated white liquor substantially saturated with respect to sodium chloride is passed by line 342 to a second stage evaporator 344 wherein the Where the sodium chloride is intended to reuse, such as to form chlorine dioxide, chlorine, sodium chlorate or sodium hydroxide, separation of the salts one from another may be required. This separation is achieved by feeding the mixture of sodium chloride and potassium chloride by line 124 to a second leacher 126 and contacting the mixture with a recycled potassium-lean aqueous solution of sodium chloride and potassium chloride fed by line 128.

The leaching in leacher 126 dissolves potassium chloride from the mixture leaving pure sodium chloride for recovery by line 130 for the required reuse, and is generally carried out at a temperature of about 75° to about 100° C., preferably about 90° to about 100° C.

The potassium enriched solution resulting from the leacher 126 is passed by line 132 to a crystallizer 134 wherein the solution is cooled, generally to a temperature in the range of about 30° to about 75° C., preferably about 40° to about 60° C., to cause crystallization of pure potassium chloride which is removed by line 136.

The mother liquor from the recrystallization is recycled by line 128 as the leach liquor for the leacher 126, after suitable heating to the leaching temperature.

If the mixture of sodium chloride and potassium chloride entering the leaching-crystallization separation operation is contaminated with sodium carbonate and/or sodium sulphate, such as, from incomplete leaching in leacher 116 or omission of leacher 116 altogether, then a purge of the recycle solution in line 128 is required to avoid the build up of sodium carbonate and/or sodium sulphate in the leaching-crystallization separation operation. This purge may be achieved by passing part of the recycle solution by line 138 to the white liquor in line 100 or to the green liquor, with the volume of cycling aqueous material being made up with water in line 140. Where the leacher 116 is present, the purge also may be made by passing part of the recycle solution to the partially concentrated white liquor in line 108.

The relative concentrations of potassium chloride and sodium chloride in the mixture precipitated from the second stage evaporator 110 depend on the relative concentrations of sodium and potassium ions in the partially concentrated white liquor in line 108 and the temperature at which the second stage evaporation is carried out.

The higher the temperature of operation of the second stage evaporator 110 at the same relative concentrations, the less is the tendency for potassium chloride to coprecipitate with sodium chloride.

To control the possible build up of potassium chloride in the white liquor, it is possible to operate the process outlined in FIG. 2 on a continuous basis, with the temperature of operation of the second stage evaporation being controlled to effect precipitation of the mixture of sodium chloride and potassium chloride in the mole ratio required to maintain steady state conditions with respect to both sodium chloride and potassium chloride in the white liquor in line 100.

Alternatively, the temperature of operation of the second stage evaporator 110 may be controlled in a cyclic manner with the temperature of operation of the evaporator 110 generally being in the range of about 75° to about 120° C., preferably about 85° to about 110° C., for the majority of the time and the temperature of operation of the evaporator 110 generally being in the range of about 40° to about 75° C., preferably about 40° to about 60° C., for the remainder of the time. In this way, sodium chloride substantially uncontaminated with potassium chloride is deposited at the higher temperature during the majority of the operation, while the potassium values build up to the potassium molar ratio values mentioned above due the recycle, and large quantities of potassium chloride co-precipitate with sodium chloride at the lower temperature during a short period of operation to deplete the potassium values from the system to potassium molar ratio values below those mentioned above.

The controlling parameter in determining the point at which the second stage evaporator 110 is switched from high temperature operation to low temperature operation, and vice versa, is the potassium molar ratio (i.e. $K/K+Na$) in the white liquor being evaporated. A ratio in the range of about 0.16 to 0.18 is the preferred boundary value.

The latter cyclic system is particularly useful, since under normal closed cycle mill operating conditions and with average potassium content in the wood, the quantity of sodium chloride required to be removed to achieve steady state operation considerably exceeds the quantity of potassium required to be removed, sodium chloride may be recovered in a form substantially uncontaminated with potassium chloride for the majority of the operation time, only two evaporative steps are required, whether the second evaporation is carried out at the high temperature or low temperature, and the required purge of potassium may be achieved in a relatively concentrated form over a short period of the operation time.

Turning now to the embodiment of FIG. 3, an alternative procedure from that illustrated in FIG. 2 is represented. In this embodiment, the second stage evaporator 110 is operated under conditions which inhibit the deposition of potassium chloride, so that the mixture in line 114 is a mixture of sodium chloride, sodium carbonate and sodium sulphate. The solid remaining after leaching in leacher 116 in line 124 is substantially pure sodium chloride. This leaching is generally effected at a temperature of about 10° to about 50° C., preferably about 20° to about 40° C. In order to inhibit the deposition of potassium chloride from the second evaporator 110, the second stage evaporator 110 generally is operated at a temperature of about 80° to about 110° C., preferably about 90° to about 110° C., and the evaporation is carried out so that potassium chloride does not reach saturation.

The concentrated white liquor resulting from the second stage evaporator 110 is passed by line 150 to a third stage evaporator 152. In the evaporator 152, the concentrated white liquor is evaporated, generally at a temperature of about 40° to about 80° C., preferably about 40° to about 70° C., to deposit potassium chloride, which is contaminated with minor amounts of burkeite and/or glaserite. This solid mixture is removed from the evaporator 152 by line 154 while the resulting concentrated white liquor in line 118 is recycled to the digestion step, as described above in connection with FIG. 2. Water evaporated from the liquor in the third stage evaporator 152 is collected by line 156.

The solid mixture in line 154 passes to a second leacher 158 wherein it is leached with water fed by line 160 to dissolve the burkeite and/or glaserite therefrom along with some of the potassium chloride, to leave substantially pure potassium chloride for recovery by line 162. The leacher 158 generally is operated at a temperature in the range of about 20° C. to about 50° C., preferably about 20° to about 40° C.

white liquor is boiled further to deposit sodium chloride therefrom, the evaporated water being collected by line 346. The second stage evaporator 344 is operated under conditions which inhibit the deposition of potassium chloride in analogous manner to the operation of the second stage evaporator 110 in the embodiment of FIG. 3.

The sodium chloride deposited from the white liquor in the second stage evaporator is generally contaminated with minor amounts of sodium carbonate and sodium sulphate. The mixture is removed from the second stage evaporator 344 by line 348, the concentrated white liquor being recycled by lines 350 and 352, after suitable dilution, to the pulping step.

The mixture is passed to a leacher 354 wherein the sodium chloride is purified by leaching with water fed by line 356 to dissolve the sodium carbonate and sodium sulphate values from the mixture, along with some sodium chloride. The leaching operation is carried out under conditions analogous to those used in leacher 116 in the embodiment of FIG. 3. The pure solid sodium chloride is removed by line 358 while the leach liquor is recycled by line 360 to the white liquor in line 328, or, if desired, to the green liquor in line 320 or 322.

The operations of two-stage evaporation and leaching purification combined with recycles to the furnace and the white liquor to effect sodium chloride removal are those described in U.S. Pat. No. 3,950,217. In this embodiment of the invention, the latter procedure for effecting sodium chloride removal, represented by the solid lines in FIG. 7, is utilized for the majority of the operation time of the recovery and regeneration system of the pulp mill.

During operation of the sodium chloride removal procedure, potassium values will build up to a level at which further operation of the procedure will deposit potassium salts. The procedure is then switched to operate as a potassium removal operation for the remainder of the operation time. As will become apparent, during the potassium removal period, sodium chloride is prevented from depositing and hence will build up in the system. Thus, in a continuously-operating pulp mill, the salts removal procedure is switched back and forth between potassium chloride and sodium chloride removal to prevent excessive build up of these salts in the system.

When potassium removal is to be effected, the differing flow paths are depicted in FIG. 7 by broken lines, the corresponding solid line flow paths being omitted. The green liquor in line 322 is diverted by lines 362 and 364 to the first stage evaporator 332, thereby bypassing the causticizer 326. The liquor fed to the first stage evaporator 332, therefore, contains uncausticized sodium carbonate.

The boiling of the green liquor in the first stage evaporator 332 generally at a temperature of about 70° to about 110° C., causes deposition of a mixture of sodium carbonate, sodium sulphate and potassium sulphate, the latter sulphate salts generally being present as glaserite. The evaporation of the green liquor in the first stage evaporator 332 preferably is effected until the resulting liquor is substantially saturated with respect to potassium chloride. The bulk of the sodium carbonate in the green liquor is deposited in this operation.

The solid mixture of sodium carbonate and glaserite is removed from the first stage evaporator 332 and is passed by line 366 to a dissolving tank 368 wherein it is dissolved in aqueous medium fed by line 370. The aqueous solution resulting from the dissolving tank 368 is passed by line 372 to the causticizer 326 for conversion of the sodium carbonate to sodium hydroxide. The sulphide-free white liquor formed thereby is removed from the causticizer 326 by line 374.

The partially concentrated sodium sulphide solution resulting from the first stage evaporator 332 is passed by line 376 to the second stage evaporator 344. The sodium sulphide concentration of the green liquor in line 364 is generally in the range of about 5 to about 30 wt.% $Na_2S$ and in line 376 is generally in the range of about 20 to about 45 wt.% $Na_2S$.

Boiling of the partially concentrated sodium sulphide solution in the second stage evaporator 344, generally at a temperature of about 40° to about 75° C., under a subatmospheric pressure, results in the deposition of potassium chloride uncontaminated by sodium chloride but possibly contaminated with minor quantities of burkeite and/or glaserite.

The concentrated sodium sulphide solution resulting from evaporation in the second stage evaporator 344 is passed by line 378 to mix with the sulphide-free white liquor in line 374 to form concentrated white liquor for recycle by line 352, after suitable dilution, to the pulping step.

The solid mixture of potassium chloride, burkeite and/or glaserite is forwarded by line 380 to the leacher 354 for purification by leaching with the aqueous medium in line 356. The leaching generally is effected at a temperature of about 10° to about 50° C., and preferably about 10° to about 30° C. The leaching dissolves the burkeite and/or glaserite from the mixture along with some potassium chloride, to leave pure solid potassium chloride which is recovered by line 382. The leach solution is recycled by line 384 to the green liquor in line 362.

The controlling parameter in determining the point at which the evaporation procedure is switched from being effected on white liquor to remove sodium chloride to being effected on green liquor to remove potassium chloride, and vice versa, is the potassium molar ratio (i.e. K/K+Na) in the liquor being evaporated. A ratio in the range of about 0.16 to 0.18 is the preferred boundary value.

Figure 8:
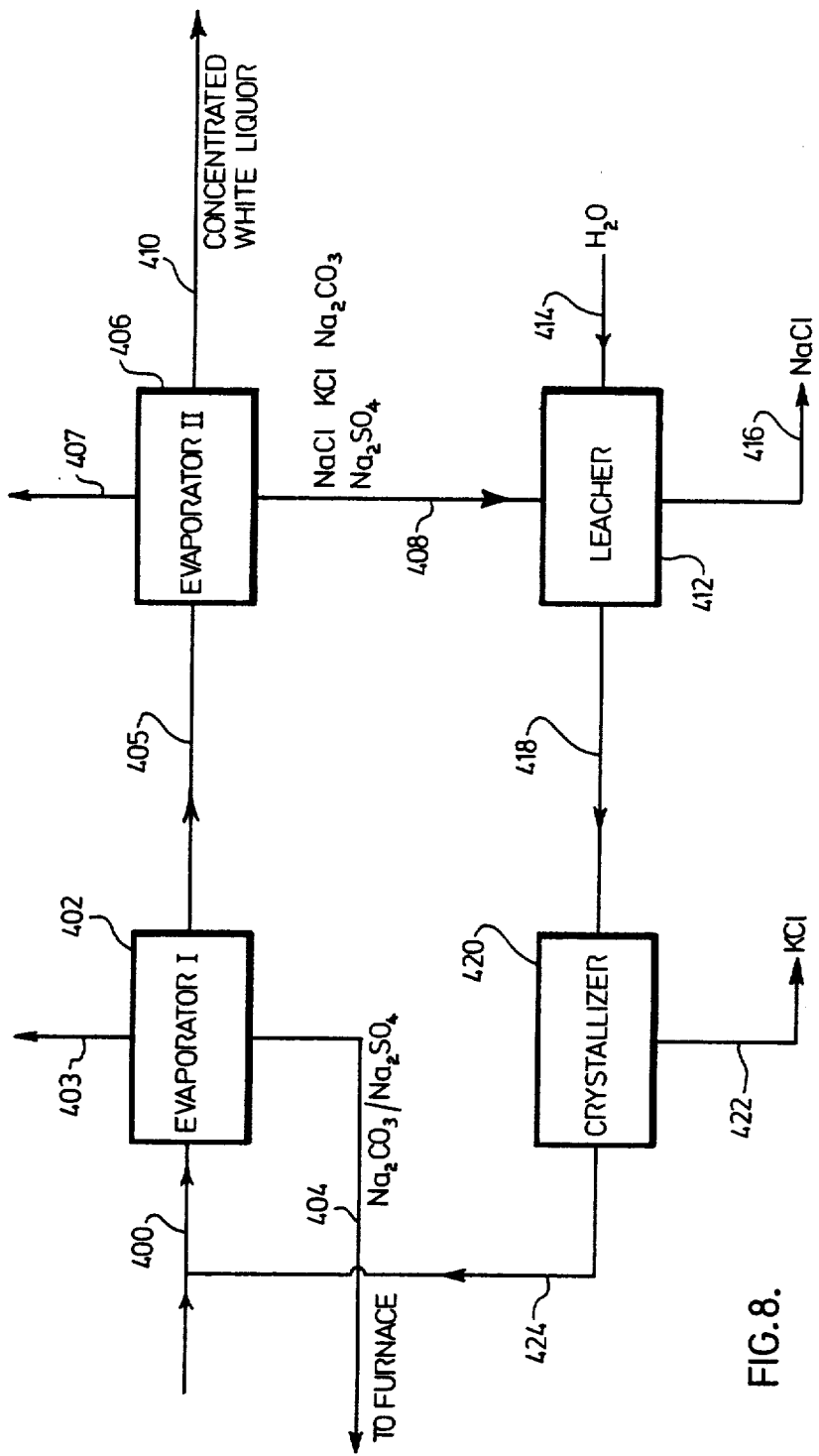
FIG. 8 is a schematic flow sheet illustrating a fifth embodiment of the invention.

Turning now to FIG. 8, there is illustrated therein a modified form of the embodiment of FIG. 2 wherein a single leaching only of the solid phase separated from the second white liquor evaporator is effected to result in purified potassium chloride and sodium chloride.

White liquor in line 400 is passed to a first evaporator 402 for evaporation to precipitate sodium sulphate, sodium carbonate and other precipitable dissolved materials other than sodium chloride and potassium chloride, the evaporation being effected under the conditions described above for evaporator 102 in the embodiment of FIG. 2, preferably at a temperature of about 100° to about 120° C., and the deposited solid phase being recycled to the furnace or to the furnace and green liquor by line 404, as described above with respect to the precipitate in line 106 in FIG. 2. Evaporated water is recovered by line 403.

The partially concentrated white liquor then is passed by line 405 to a second stage evaporator 406 wherein it is further evaporated to deposit a mixture of sodium chloride and potassium chloride contaminated with minor quantities of sodium carbonate and sodium sulphate which is removed by line 408. The latter evaporation is effected under the conditions described above with respect to evaporator 110 in FIG. 2, preferably at about 90° to about 110° C.

The concentrated white liquor is removed from the second stage evaporator 406 by line 410 and provides at least part of the pulping liquor used in the digester, generally after suitable dilution.

The solid mixture in line 408 is fed to a leacher 412 wherein it is contacted with hot water fed by line 414, generally having a temperature of about 75° to about 100° C., preferably about 90° to 100° C., to dissolve all the potassium chloride, sodium carbonate and sodium sulphate along with some sodium chloride, but leaving the majority of the sodium chloride as a substantially pure solid product for removal by line 416.

The hot leach liquor is passed by line 418 to a crystallizer 420 wherein the leach liquor is cooled, generally to a temperature in the range of about 30° to about 75° C., preferably about 40° to about 60° C., to cause crystallization of substantially pure potassium chloride which is removed by line 422. The mother liquor from the crystallization then is recycled by line 424 to the white liquor in line 400.

EXAMPLES

EXAMPLE 1

Figure 9:
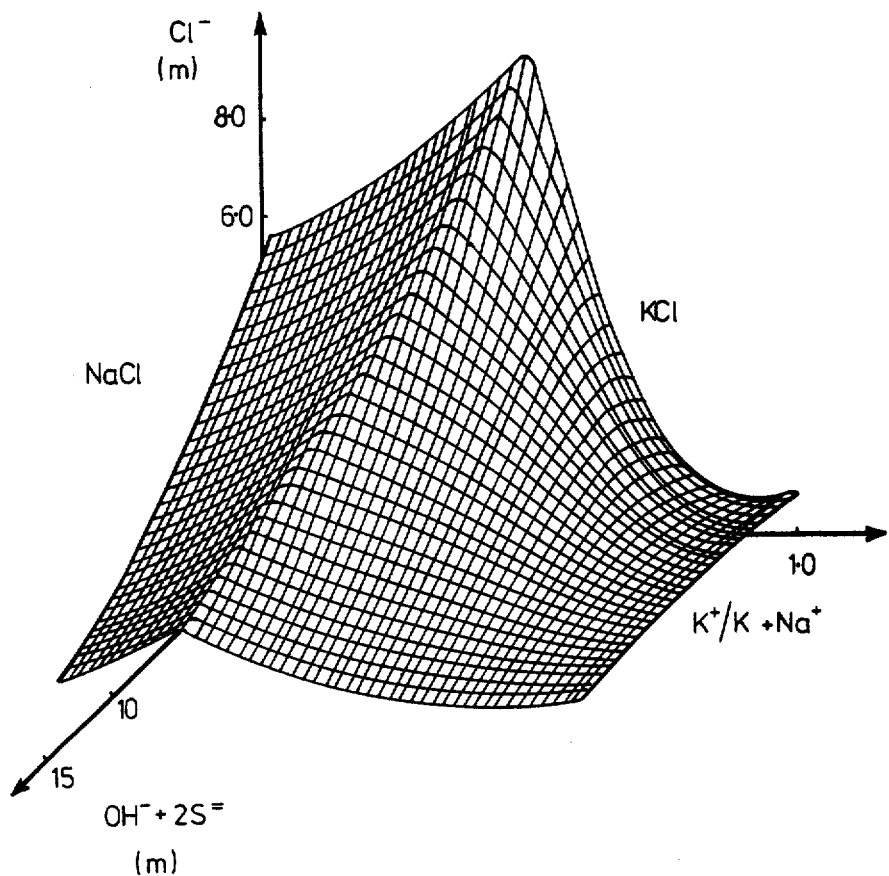
FIGS. 9 to 14 are graphical representations of the solubility characteristics of a multi-ionic aqueous system.
Figure 10:
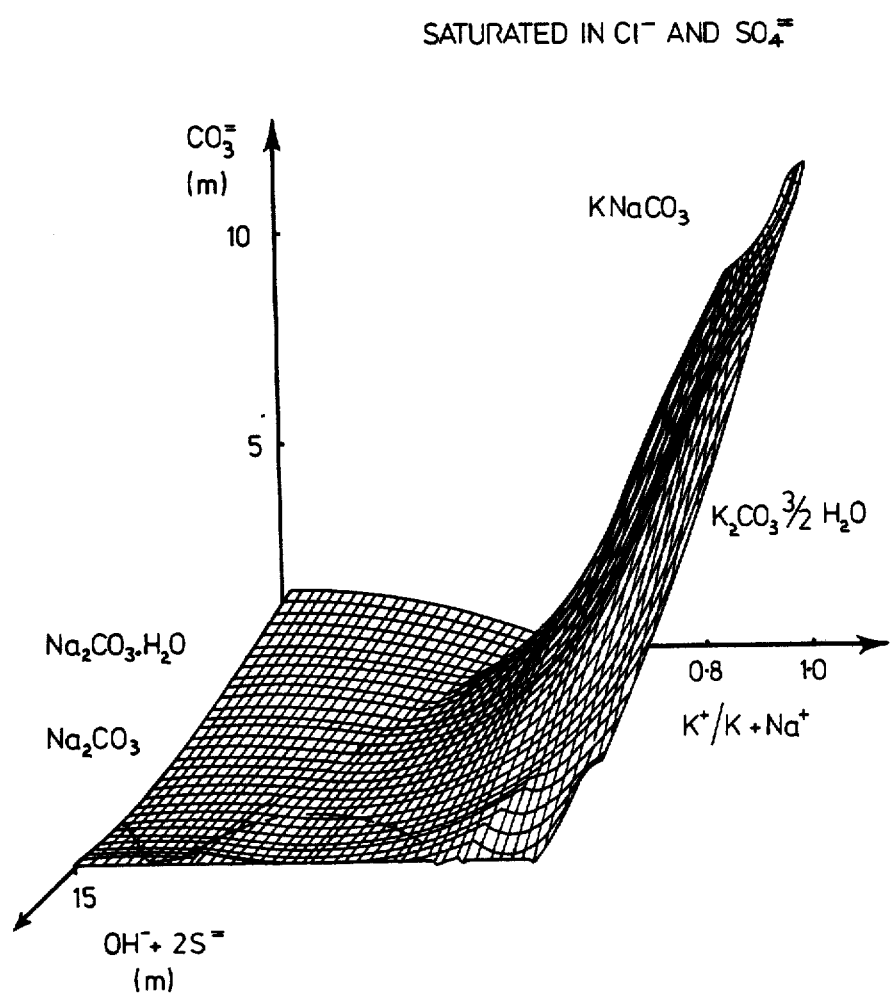
Figure 11:
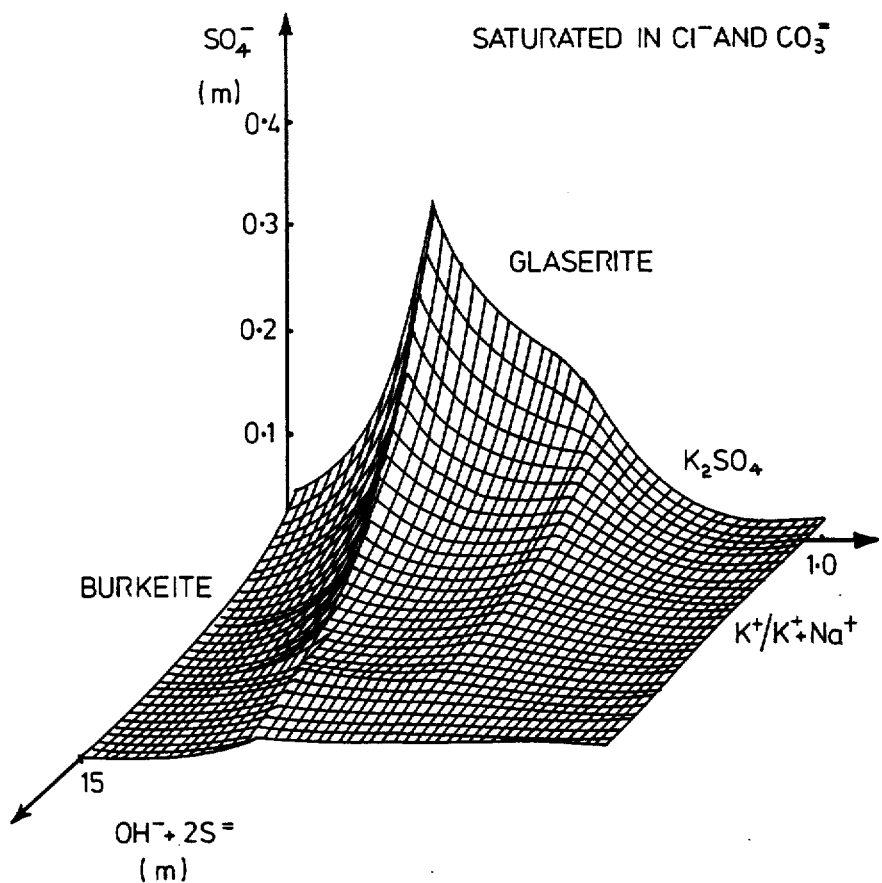
Figure 12:
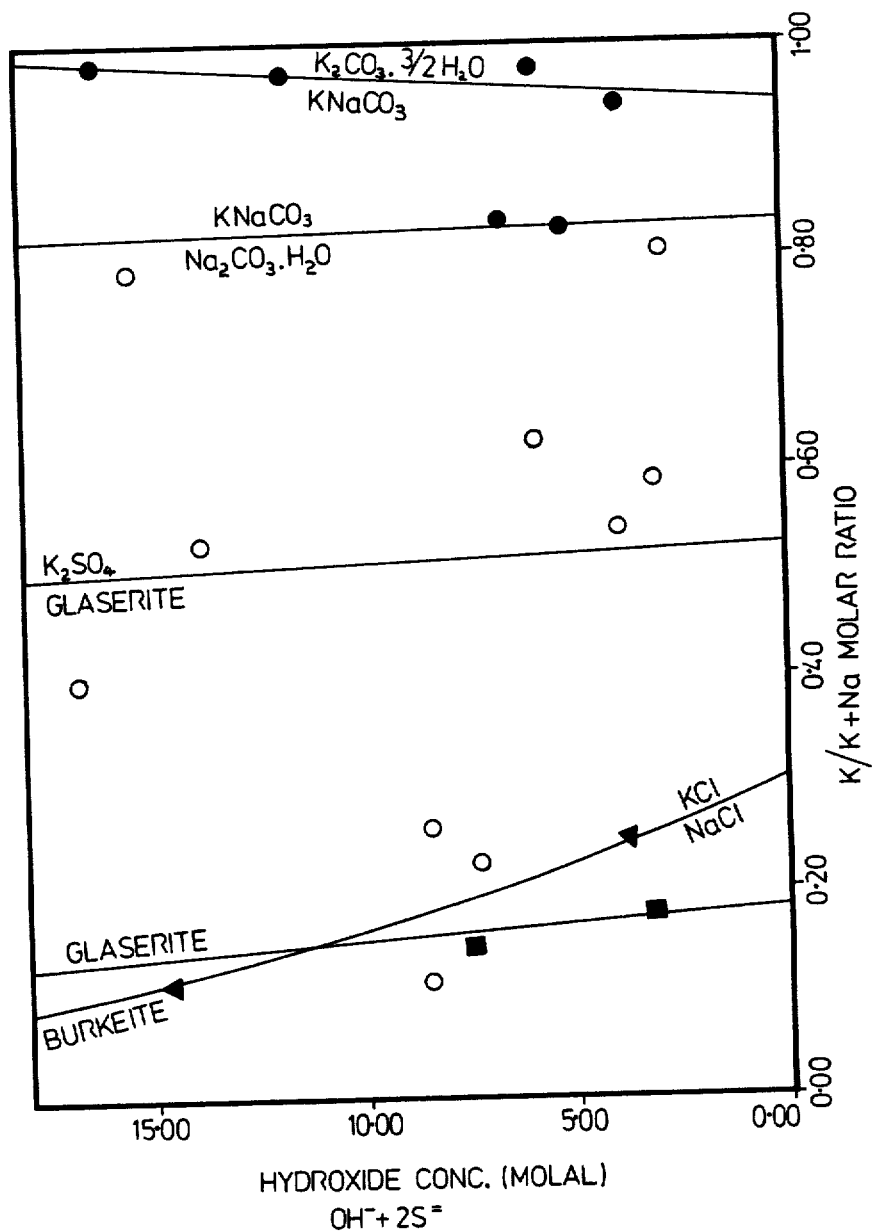
Figure 13:
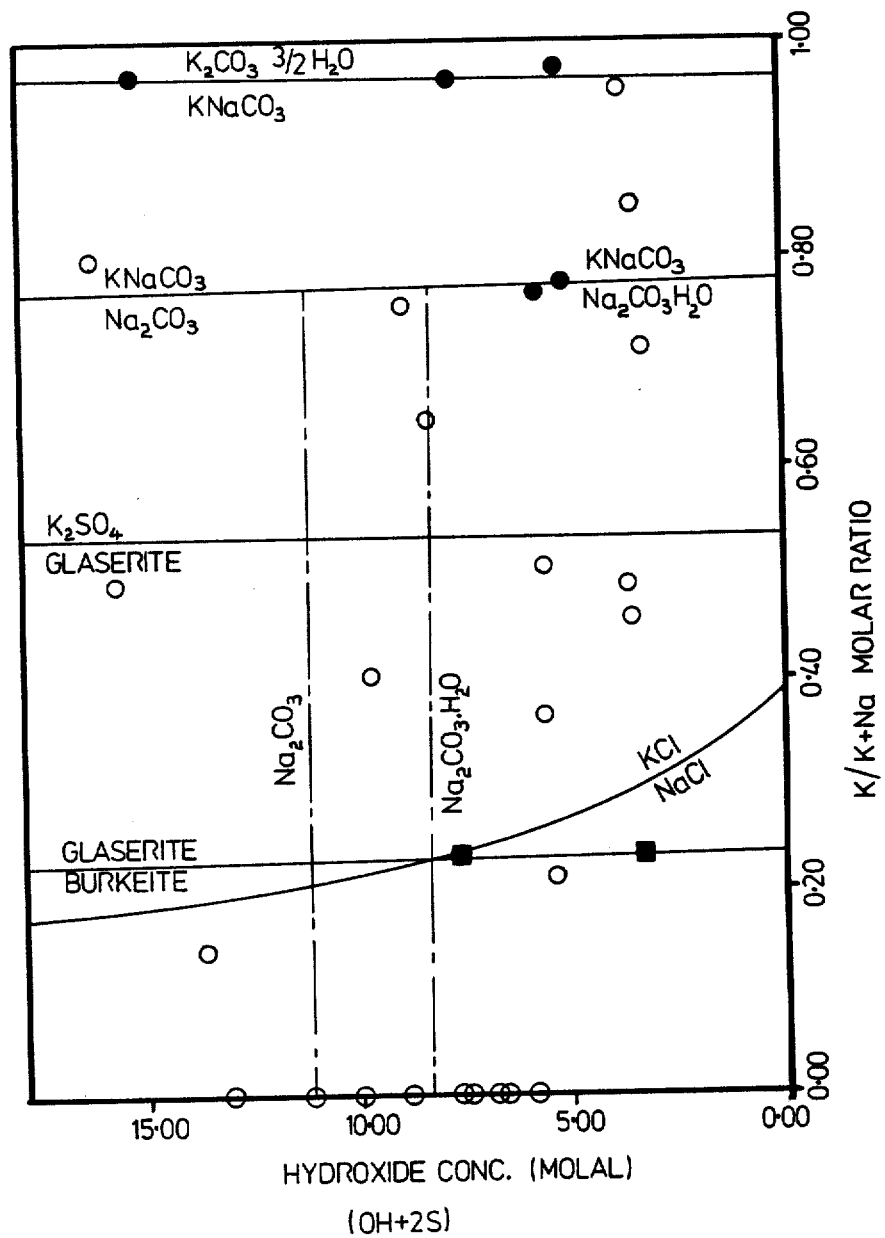
Figure 14:
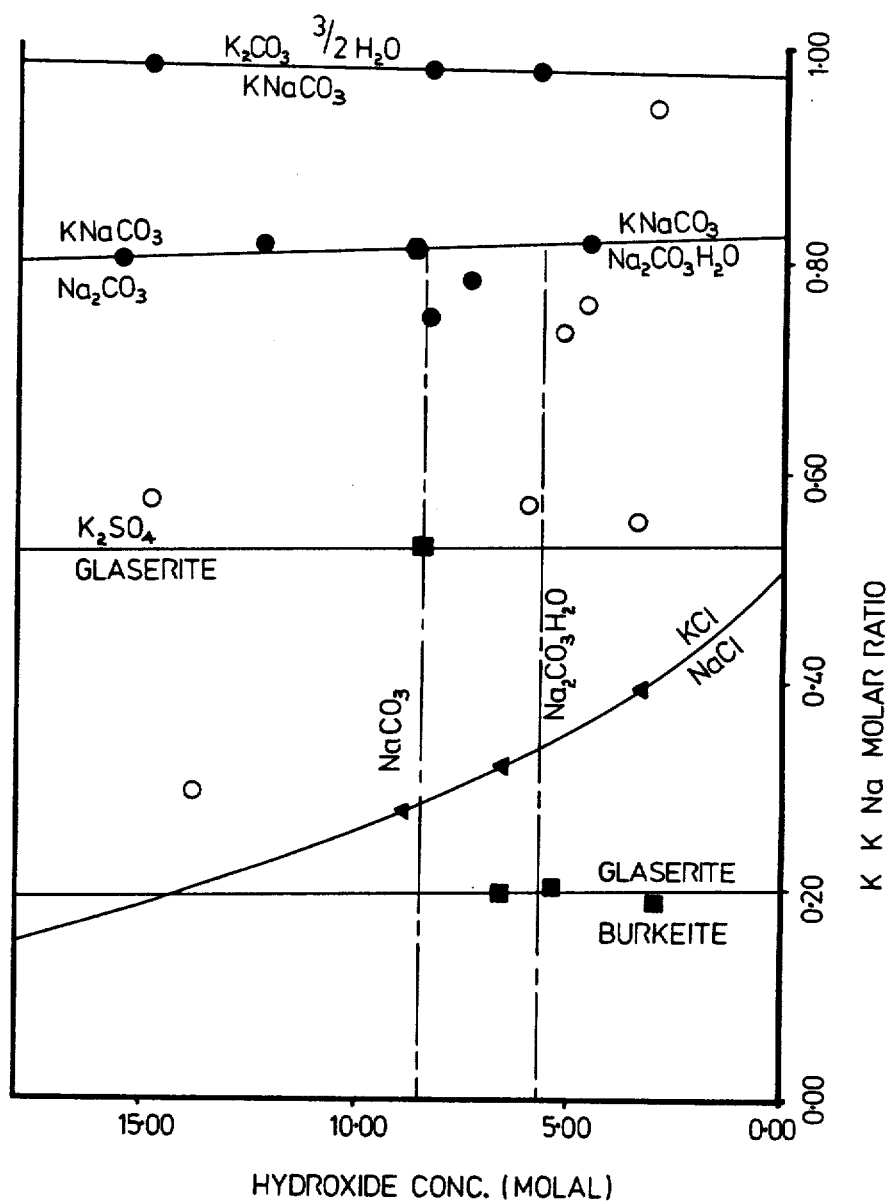

The solubility characteristics of an aqueous system containing the ionic species $K^+$, $Na^+$, $OH^-$, $S^=$, $Cl^-$, $CO_3^=$ and $SO_4^=$ were studied. FIGS. 9 to 11 are graphical representations of part of this study, showing, respectively, the solubility of chloride at 100° C. when the system is saturated with $CO_3^=$ and $SO_4^=$, the solubility of carbonate at 100° C., when the system is saturated with $Cl^-$ and $SO_4^=$, and the solubility of sulphate at 100° C. when the system is saturated with $Cl^-$ and $CO_3^=$. FIGS. 12 to 14 are also graphical representations of part of this study showing the stable solid phase transitions upon variation of potassium molar ratio (K/K+ Na) and total alkali concentration ($Na_2S$+ NaOH) at 50° C., 75° C. and 100° C. respectively.

In the following Examples, while steady state conditions are assumed, potassium chloride recovery values generally do not match steady state input values. If the potassium input is from about 2 to about 7 lb/ton of pulp, this corresponds to 0.05 to 0.18 lb.mol/ton. In the Examples, the maximum potassium purge achievable under the given process conditions usually is illustrated. These purge values are always in excess of that required, and to run on a continuous steady state basis some adjustments may be made to the operating conditions.

EXAMPLE 2

Based on the solubility data determined in accordance with Example 1, a mass balance was determined for a pulp mill using the procedure outlined in FIG. 2, wherein the second stage evaporator is always operated at the same high temperature.

The first stage evaporator 102 operating temperature was assumed to be 120° C., the second stage evaporator 110 operating temperature was assumed to be 100° C. and the leacher 116 operating temperature was considered to be 50° C.

The results are reproduced in the following Table I:

TABLE I

| Line No. | Water lb/ton of pulp | Solution composition Molality (lb-mol/1000 lb $H_2O$) | | | | | | Solid Phases lb-mol/ton of pulp | | | | |
|---|---|---|---|---|---|---|---|---|---|---|---|---|
| | | $OH^-$ | $S^-$ | $Cl^-$ | $CO_3^=$ | $SO_4^=$ | $R^{(1)}$ | NaCl | KCl | $Na_2CO_3$ | Burkeite[2] | Glaserite |
| 98 | 6000 | 2.5 | 0.5 | 0.75 | 0.3 | 0.05 | 0.16 | — | — | — | — | — |
| 100 | 6050 | 2.48 | 0.496 | 0.79 | 0.31 | 0.049 | 0.162 | — | — | — | — | — |
| 104 | 4450 | — | — | — | — | — | — | — | — | — | — | — |
| 106 | — | — | — | — | — | — | — | — | — | 1.69 | 0.30 | — |
| 108 | 1640 | 9.13 | 1.83 | 2.91 | 0.03 | 0.001 | 0.189 | — | — | — | — | — |
| 112 | 480 | — | — | — | — | — | — | — | — | — | — | — |
| 114 | — | — | — | — | — | — | — | 2.11 | 0.32 | 0.086 | — | — |
| 118 | 1164 | 12.9 | 2.57 | 2.01 | 0.03 | 0.001 | 0.201 | — | — | — | — | — |
| 120 | 50 | — | — | — | — | — | — | — | — | — | — | — |
| 122 | 50 | — | — | 5.97 | 1.83 | — | 0.29 | — | — | — | — | — |
| 124 | — | — | — | — | — | — | — | 1.96 | 0.19 | — | — | — |

Note

[1] R is the molar ratio K/K + Na

[2] Burkeite determination is as $SO_4$

The quantities of sodium chloride and potassium chloride in the purified mixture in line 124 are considered to be adequate to achieve steady state removal of these salts under normal closed mill operation.

EXAMPLE 3

Based on the solubility data determined in accordance with Example 1, a mass balance was determined for a pulp mill using the procedure outlined in FIG. 2, wherein the operating temperature of the second stage evaporator varies between high and low temperatures, to achieve sodium chloride separation only in the high temperature phase and a mixture of sodium and potassium chlorides in the low temperature phase.

The operating temperatures of the two phases of operation are as outlined in the following Table II:

TABLE II

| | High Temperature | Low Temperature |
|---|---|---|
| First Stage Evaporator 102 | 120° C. | 120° C. |
| Second Stage Evaporator 110 | 100° C. | 40° C. |
| Leacher 116 | 50° C. | 50° C. |

The results are reproduced in the following Tables IIIA and IIIB, with Table IIIA showing the high temperature phase and Table IIIB showing the low temperature phase:

TABLE IIIA

| Line No. | Water lb/ton of pulp | Solution Composition molality (lb-mol/1000 lb. H$_2$O) | | | | | | Solid Phases lb.mol/ton of pulp | | | | |
|---|---|---|---|---|---|---|---|---|---|---|---|---|
| | | OH$^-$ | S$^=$ | Cl$^-$ | CO$_3^=$ | SO$_4^=$ | R$^{(1)}$ | NaCl | KCl | Na$_2$CO$_3$ | Burkeite$^{(2)}$ | Glaserite |
| 98 | 6000 | 2.5 | 0.5 | 0.75 | 0.3 | 0.05 | 0.155 | | | | | |
| 100 | 6080 | 2.47 | 0.49 | 0.80 | 0.32 | 0.05 | 0.152 | | | | | |
| 104 | 4430 | | | | | | | | | | | |
| 106 | | | | | | | | — | — | 1.64 | 0.299 | |
| 108 | 1650 | 9.13 | 1.83 | 2.97 | 0.03 | 0.001 | 0.180 | | | | | |
| 112 | 490 | | | | | | | | | | | |
| 114 | | | | | | | | 2.56 | — | 0.16 | 0.003 | |
| 118 | 1160 | 12.19 | 2.57 | 2.02 | 0.02 | 0.001 | 0.198 | | | | | |
| 120 | 80 | | | | | | | | | | | |
| 122 | 80 | — | — | 4.5 | 2.0 | 0.04 | — | | | | | |
| 124 | | | | | | | | 2.2 | — | — | — | — |

Notes
$^{(1)}$R is mole ratio K/K + Na
$^{(2)}$Burkeite is determined as SO$_4^=$

TABLE IIIB

| Line No. | Water lb/ton of pulp | Solution Composition Molality (lb.-mol/1000 lb. H$_2$O) | | | | | | Solid Phases lb.-mol/ton of pulp | | | | |
|---|---|---|---|---|---|---|---|---|---|---|---|---|
| | | OH$^-$ | S$^=$ | Cl$^-$ | CO$_3^=$ | SO$_4^=$ | R* | NaCl | KCl | Na$_2$CO$_3$ | Burkeite | Glaserite |
| 98 | 6000 | 2.5 | 0.5 | 0.75 | 0.3 | 0.05 | 0.155 | | | | | |
| 100 | 6070 | 2.47 | 0.49 | 0.81 | 0.32 | 0.05 | 0.158 | | | | | |
| 104 | 4420 | | | | | | | | | | | |
| 106 | | | | | | | | — | — | 1.64 | 0.299 | — |
| 108 | 1650 | 9.13 | 1.83 | 2.97 | 0.03 | 0.001 | 0.184 | | | | | |
| 112 | 150 | | | | | | | | | | | |
| 114 | | | | | | | | 1.3 | 1.4 | 0.12 | 0.001 | — |
| 118 | 1500 | 10.0 | 2.00 | 1.47 | 0.02 | 0.001 | 0.155 | | | | | |
| 120 | 70 | | | | | | | | | | | |
| 122 | 70 | — | — | 6.0 | 1.8 | 0.02 | 0.29 | | | | | |
| 124 | | | | | | | | 1.1 | 1.2 | — | — | — |

EXAMPLE 4

The solubility data determined in accordance with Example 1 was used to provide a mass balance for a pulp mill using the procedure outlined in FIG. 3.

The operating temperature of the first stage evaporator 102 was assumed to be 120° C., the operating temperature of the second stage evaporator 110 was assumed to be 100° C., the operating temperature of the third stage evaporator 152 was assumed to be 50° C. and the operating temperature of the leacher 116 was assumed to be 50° C.

The results are reproduced in the following Table IV:

suitable adjustment of the operating temperatures and times of the evaporators may be used to control the quantity of potassium removed, while steady state conditions of sodium chloride concentrations are maintained.

EXAMPLE 5

Using the solubility data determinations of Example 1, a mass balance was calculated for a pulp mill using the procedure of FIG. 6.

In this calculation, it was assumed that the operating temperature of the first stage evaporator 102 is 120° C., that of the second stage evaporator 110 is 100° C., that of the third stage evaporator 212 is 50° C. and that of the leacher 116 is 50° C.

TABLE IV

| Line No. | Water lb/ton of pulp | Solution Composition Molality (lb-mole/1000 lb. H$_2$O) | | | | | | Solid Phases lb.-mol/ton of pulp | | | | |
|---|---|---|---|---|---|---|---|---|---|---|---|---|
| | | OH$^-$ | S$^-$ | Cl$^-$ | CO$_3^=$ | SO$_4^=$ | R$^{(1)}$ | NaCl | KCl | Na$_2$CO$_3$ | Burkeite$^{(2)}$ | Glaserite |
| 98 | 6000 | 2.5 | 0.5 | 0.75 | 0.3 | 0.05 | 0.160 | — | — | — | — | — |
| 100 | 6030 | 2.49 | 0.497 | 0.77 | 0.31 | 0.05 | 0.159 | — | — | — | — | — |
| 104 | 4390 | — | — | — | — | — | — | — | — | — | — | — |
| 106 | — | — | — | — | — | — | — | — | — | 1.66 | 0.30 | — |
| 108 | 1640 | 9.13 | 1.83 | 2.81 | 0.03 | 0.01 | 0.191 | — | — | — | — | — |
| 112 | | — | — | — | — | — | — | — | — | — | — | — |
| 114 | — | — | — | — | — | — | — | 1.90 | — | 0.063 | — | — |
| 150 | 1290 | 11.65 | 2.33 | 2.13 | 0.03 | 0.00 | 0.206 | — | — | — | — | — |
| 120 | 30 | — | — | — | — | — | — | — | — | — | — | — |
| 122 | 30 | 0 | 0 | 4.5 | 2.0 | 0 | 0 | — | — | — | — | — |
| 124 | — | — | — | — | — | — | — | 1.76 | — | — | — | — |
| 156 | 0 | — | — | — | — | — | — | — | — | — | — | — |
| 154 | — | — | — | — | — | — | — | — | 1.22 | 0.02 | — | — |
| 118 | 1290 | 11.65 | 2.33 | 1.36 | 0.01 | 0.00 | 0.161 | — | — | — | — | — |

Notes
$^{(1)}$R refers to the molar ratio K/K + Na
$^{(2)}$Burkeite determination is as SO$_4$ The quantity of potassium removed by this procedure is considerably in excess of that which would be encountered under steady state conditions. However, The results are reproduced in the following Table V: the second stage evaporator 344 was assumed to be 100° C.

TABLE V

| Line No. | Water lb/ton of pulp | Solution Composition Molality (lb-mol/1000 lb H₂O) | | | | | | Solid Phases lb-mol/ton of pulp | | | | |
|---|---|---|---|---|---|---|---|---|---|---|---|---|
| | | OH | S | Cl | CO₃⁻ | SO₄⁻ | R⁽¹⁾ | NaCl | KCl | Na₂CO₃ | Burkeite⁽²⁾ | Glaserite |
| 98 | 6000 | 2.5 | 0.5 | 0.80 | 0.3 | 0.05 | 0.158 | — | — | — | — | — |
| 100 | 6025 | 2.49 | 0.498 | 0.815 | 0.31 | 0.05 | 0.151 | — | — | — | — | — |
| 104 | 4385 | — | — | — | — | — | — | — | — | — | — | — |
| 106 | — | — | — | — | — | — | — | — | — | 1.64 | 0.30 | — |
| 108 | 1370 | 9.13 | 1.83 | 2.81 | 0.03 | 0.001 | 0.191 | — | — | — | — | — |
| 112 | 300 | — | — | — | — | — | — | — | — | — | — | — |
| 114 | — | — | — | — | — | — | — | 1.9 | — | 0.03 | — | — |
| 118 | 1070 | 11.65 | 2.33 | 2.13 | 0.03 | 0.00 | 0.206 | — | — | — | — | — |
| 120 | 25 | — | — | — | — | — | — | — | — | — | — | — |
| 122 | 25 | 0 | 0 | 4.5 | 2.0 | 0 | 0 | — | — | — | — | — |
| 124 | — | — | — | — | — | — | — | 1.8 | — | — | — | — |
| 210 | 270 | 9.13 | 1.83 | 2.81 | 0.03 | 0.001 | 0.191 | — | — | — | — | — |
| 216 | 40 | — | — | — | — | — | — | — | — | — | — | — |
| 214 | — | — | — | — | — | — | — | 0.2 | 0.2 | 0.01 | — | — |
| 218 | 230 | 10.5 | 2.0 | 1.56 | 0.03 | 0 | 0.163 | — | — | — | — | — |
| comb. 118/218 | 1600 | 11.48 | 2.28 | 2.04 | 0.03 | 0 | 0.200 | — | — | — | — | — |

Note
⁽¹⁾R is the mole ratio K/K + Na
⁽²⁾Burkeite determination is as SO₄

The quantities of sodium chloride and potassium chloride removed by this procedure in lines 124 and 214 are considered to be adequate to achieve steady state removal of these salts under normal closed mill operation.

EXAMPLE 6

Based on the solubility data determination of Example 1, a mass balance was calculated for a pulp mill using the procedure of FIG. 7.

In the sodium chloride removal phase, the operating temperature of the first stage evaporator 312 was assumed to be 120° C. and the operating temperature of the second stage evaporator 344 was assumed to be 100° C.

In the potassium chloride removal phase, the operating temperature of the first stage evaporator 312 was assumed to be 120° C. and the operating temperature of the second stage evaporator 344 was assumed to be 60° C.

The results are reproduced in the following Tables VIA and VIB. The results in Table VIA show those for the sodium chloride removal phase while the results in Table VIB show those for the potassium chloride removal phase.

TABLE VIA

| Line No. | Water lb/ton of pulp | Solution Composition Molality (lb-mol.1000 lb.H₂O) | | | | | | Solid Phases lb.mol/ton of pulp | | | | |
|---|---|---|---|---|---|---|---|---|---|---|---|---|
| | | OH | S | Cl | CO₃⁻ | SO₄⁻ | R* | NaCl | KCl | Na₂SO₃ | Burkeite | Glaserite |
| 328 | 6000 | 2.5 | 0.5 | 0.75 | 0.30 | 0.05 | 0.16 | — | — | — | — | — |
| 330 | 6070 | 2.47 | 0.49 | 0.79 | 0.31 | 0.049 | 0.157 | — | — | — | — | — |
| 334 | 4318 | — | — | — | — | — | — | — | — | — | — | — |
| 336 | — | — | — | — | — | — | — | — | — | 1.64 | 0.3 | — |
| 342 | 1752 | 8.56 | 1.71 | 2.73 | 0.07 | 0.02 | 0.185 | — | — | — | — | — |
| 346 | 528 | — | — | — | — | — | — | — | — | — | — | — |
| 348 | — | — | — | — | — | — | — | 2.5 | — | 0.10 | — | — |
| 350 | 1224 | 12.26 | 2.45 | 2.05 | 0.02 | 0.001 | 0.203 | — | — | — | — | — |
| 356 | 70 | — | — | — | — | — | — | — | — | — | — | — |
| 360 | 70 | 0 | 0 | 1.63 | 1.45 | 0 | 0 | — | — | — | — | — |
| 358 | — | — | — | — | — | — | — | 2.20 | — | — | — | — |

TABLE VIB

| Line No. | Water lb/ton of pulp | Solution Composition Molality (lb-mol/ 1000lb H₂O) | | | | | | Solid Phases lb-mol/ton of pulp | | | | |
|---|---|---|---|---|---|---|---|---|---|---|---|---|
| | | OH | S | Cl | CO₃⁻ | SO₄⁻ | R⁽¹⁾ | NaCl | KCl | Na₂CO₃ | Burkeite⁽²⁾ | Glaserite |
| 364 | 6010 | 0.1 | 0.5 | 0.75 | 1.5 | 0.05 | 0.17 | — | — | — | — | — |
| 334 | 5112 | — | — | — | — | — | — | — | — | — | — | — |
| 366 | — | — | — | — | — | — | — | — | — | 8.94 | — | 0.28 |
| 376 | 888 | 0.67 | 3.37 | 5.1 | 0.09 | 0.02 | 0.381 | — | — | — | — | — |
| 346 | 120 | — | — | — | — | — | — | — | — | — | — | — |
| 380 | — | — | — | — | — | — | — | — | 2.4 | 0.02 | — | 0.005 |
| 378 | 768 | 0.78 | 3.9 | 2.9 | 0.08 | 0.02 | 0.225 | — | — | — | — | — |
| 356 | 10 | — | — | — | — | — | — | — | — | — | — | — |
| 384 | 10 | — | — | 4.5 | 2.3 | — | 0.5 | — | — | — | — | — |
| 382 | — | — | — | — | — | — | — | — | — | 2.3 | — | — |

Notes:
⁽¹⁾R is the molar ratio K/K + Na
⁽²⁾Burkeite determination is as SO₄

The quantity of potassium chloride recovered by this procedure is sufficient to control the potassium level in a mill by intermittent use of the procedure.

EXAMPLE 7

A mass balance for the separation of a mixture of potassium chloride and sodium chloride using the procedure of FIG. 2 was calculated based on the known solubility data for the system NaCl-KCl-$H_2O$.

The temperature of operation of the leacher 126 was assumed to be 100° C. while the temperature of operation of the crystallizer 134 was assumed to be 40° C. The results are reproduced in the following Table VII:

TABLE VII

| Line No. | $H_2O$ lb/ton of pulp | Solution Concentration Cl (molality) | K/K + Na | NaCl | Solid Phase KCl (lb-mol/ton of pulp) |
|---|---|---|---|---|---|
| 124 | — | — | 0.2 | 0.8 | 0.2 |
| 128 | 130 | 7.89 | 0.377 | — | — |
| 130 | — | — | — | 0.8 | — |
| 132 | 130 | 9.44 | 0.5 | — | — |
| 136 | — | — | — | — | 0.2 |

The sodium chloride and potassium chloride thus are separated completely from one another.

EXAMPLE 8

Based on the solubility data determination of Example 1, a mass balance was calculated for a pulp mill using the procedure outlined in FIG. 8.

The first stage evaporator 402 operating temperature was assumed to be 120° C., the second stage evaporator 406 was assumed to be 100° C., the leacher 412 operating temperature was assumed to be 90° C. and the crystallizer 420 operating temperature was assumed to be 50° C.

The results are reproduced in the following Table VIII:

TABLE VIII

| Line No. | Water lb.ton pulp | Solution Composition Molality (lb.mol/1000 lb $H_2O$) | | | | | Solid Phases lb-mol/ton of pulp | | | | |
|---|---|---|---|---|---|---|---|---|---|---|---|
| | | $OH^-$ | $S^-$ | $Cl^-$ | $CO_3^=$ | $SO_4^=$ | $R^{(1)}$ | NaCl | KCl | $Na_2CO_3$ | Burkeite[2] | Glaserite |
| 400 | 6100 | 2.46 | 0.49 | 0.84 | 0.315 | 0.05 | 0.174 | | | | | |
| 403 | 4450 | | | | | | | | | | | |
| 404 | | | | | | | | — | — | 1.65 | 0.3 | — |
| 405 | 1650 | 9.13 | 1.83 | 3.11 | 0.03 | 0.001 | 0.20 | | | | | |
| 407 | 490 | | | | | | | | | | | |
| 410 | 1160 | 12.86 | 2.57 | 2.01 | 0.01 | 0.001 | 0.201 | | | | | |
| 408 | | | | | | | | 2.25 | 0.54 | 0.12 | 0.001 | — |
| 414 | 100 | | | | | | | | | | | |
| 416 | | | | | | | | 1.83 | — | — | — | — |
| 418 | 100 | — | — | 9.3 | 1.2 | 0.01 | 0.48 | | | | | |
| 422 | | | | | | | | — | 0.3 | — | — | — |
| 424 | 100 | — | — | 6.3 | 1.2 | 0.01 | 0.3 | | | | | |

Notes:
(1) R is molar ratio K/K + Na
(2) Burkeite is determined as $SO_4$

SUMMARY OF DISCLOSURE

The present invention, therefore, provides processes for controlling the level of potassium values and sodium chloride in a pulp mill so that efficient continuous closed cycle pulp mill processes may be carried out. Modifications are possible within the scope of the invention.

What we claim is:

1. A continuous process of pulping cellulosic fibrous material including the steps of:

contacting said cellulosic fibrous material with a pulping liquor containing sodium hydroxide as at least one active pulping chemical, separating the pulped material from spent pulping liquor, subjecting said spent pulping liquor to a recovery and regeneration operation including a furnacing step and a causticization step to form a white liquor containing sodium hydroxide, sodium sulphate, sodium chloride and potassium values, said white liquor having a potassium molar ratio (K/K+Na) in the region of 0.14 to 0.25, evaporating said white liquor by boiling the same at a temperature of about 50° to about 120° C. to deposit a mixture containing sodium carbonate and sodium sulphate therefrom until the mother liquor is substantially saturated with respect to sodium chloride, separating said deposited mixture from the resulting mother liquor, recycling at least part of said deposited mixture to said furnacing step, evaporating said mother liquor by boiling at a temperature of about 80° to about 110° C. to deposit therefrom sodium chloride substantially uncontaminated with potassium chloride until said evaporated mother liquor is substantially saturated with respect to potassium chloride, separating said deposited sodium chloride from the resulting concentrated white liquor, evaporating said concentrated white liquor by boiling at a temperature of about 40° to about 80° C. to deposit potassium chloride therefrom, and separating the deposited potassium chloride from the resulting mother liquor.

2. The process of claim 1, wherein said white liquor boiling temperature is about 75° to about 110° C.

3. The process of claim 1, wherein said mother liquor boiling temperature is about 90° to about 110° C.

4. The process of claim 1, wherein said concentrated white liquor boiling temperature is about 40° to about 70° C.

5. The process of claim 1 wherein said potassium chloride is deposited in admixture with sodium carbonate and sodium sulphate and including leaching said mixture at a temperature of about 20° to about 50° C. to dissolve contaminants of said potassium chloride therefrom and leave substantially pure potassium chloride, and recycling the leach liquor to said white liquor.

6. The process of claim 1 wherein said pulping liquor also contains sodium sulphide as an active pulping chemical.

7. A continuous process of pulping cellulosic fibrous material including the steps of:
- contacting said cellulosic fibrous material with a pulping liquor containing sodium hydroxide as at least one active pulping chemical,
- separating the pulped material from spent pulping liquor,
- subjecting said spent pulping liquor to a recovery and regeneration operation including a furnacing step and a causticization step to form a white liquor containing sodium hydroxide, sodium sulphate, sodium chloride and potassium values, said white liquor having a potassium molar ratio (K/K+Na) in the region of 0.14 to 0.25,
- evaporating said white liquor by boiling at a temperature of about 50° to about 120° C. to deposit a mixture containing sodium carbonate and sodium sulphate therefrom until the evaporated white liquor is substantially saturated with respect to sodium chloride and/or potassium chloride,
- separating said deposited mixture from the resulting mother liquor,
- recycling at least part of said deposited mixture to said furnacing step,
- evaporating a portion of said mother liquor by boiling at a temperature of about 80° to about 110° C. to deposit therefrom sodium chloride substantially uncontaminated with potassium chloride,
- separating said deposited sodium chloride from the resulting first portion of concentrated white liquor,
- evaporating the remainder of said mother liquor by boiling at a temperature of about 40° to about 60° C. to deposit therefrom potassium chloride in admixture with sodium chloride, and
- separating said deposited potassium chloride from the resulting second portion of concentrated white liquor.

8. The process of claim 7 wherein said mother liquor portion boiling temperature is about 90° to about 110° C.

9. The process of claim 7 wherein said mother liquor remainder boiling temperature is about 50° to about 60° C.

10. The process of claim 3 including separating substantially pure solid potassium chloride from said mixture.

11. The process of claim 7 wherein said pulping liquor also contains sodium sulphide as an active pulping chemical.

12. A continuous process of pulping cellulosic fibrous material including the steps of:
- contacting said cellulosic fibrous material with a pulping liquor containing sodium hydroxide as at least one active pulping chemical,
- separating the pulped material from spent pulping liquor,
- subjecting said spent pulping liquor to a recovery and regeneration operation including a furnacing step and a causticization step to form a white liquor containing sodium hydroxide, sodium sulphate, sodium chloride and potassium values, said white liquor having a potassium molar ratio (K/K+Na) in the region of 0.14 to 0.25,
- evaporating said white liquor by boiling at a temperature of about 50° to about 120° C. to deposit a mixture containing sodium carbonate and sodium sulphate therefrom until the resulting mother liquor is substantially saturated with respect to sodium chloride and/or potassium chloride,
- separating said deposited mixture from the resulting mother liquor,
- recycling at least part of said deposited mixture to said furnacing step,
- evaporating said mother liquor by boiling at a temperature of about 30° to about 110° C. to deposit a mixture of sodium chloride and potassium chloride containing relative proportions of these salts corresponding to the relative proportions of sodium chloride and potassium values present in said white liquor as a result of introduction from exteriorally of the process,
- separating said mixture of sodium chloride and potassium chloride in admixture with minor quantities of sodium carbonate, burkeite and/or glaserite from the resulting concentrated white liquor,
- leaching said mixture at a temperature of about 5° to about 50° C. to dissolve all said sodium carbonate, burkeite and/or glaserite values from said mixture,
- recycling the resulting aqueous solution to said white liquor,
- leaching the resulting purified solid mixture of sodium chloride and potassium chloride at a temperature of about 75° to about 100° C. to dissolve all said potassium chloride values therefrom and leave substantially pure solid sodium chloride for recovery,
- cooling the leach liquor from the latter leaching to a temperature in the range of about 30° to about 75° C. to cause deposition of substantially pure potassium chloride for recovery, and
- recycling the resulting mother liquor to said second-named leaching step.

13. The process of claim 12 wherein said mother liquor boiling temperature is about 50° to about 75° C.

14. The process of claim 12, wherein said first-named leaching step is effected at a temperature of about 15° to about 30° C.

15. The process of claim 12, wherein said second-named leaching step is effected at a temperature of about 90° to about 100° C. and said cooling is effected to a temperature of about 40° to about 60° C.

16. The process of claim 12, wherein said pulping liquor contains sodium sulphide as an active pulping chemical.

17. A continuous process of pulping cellulosic fibrous material including the steps of:
- contacting said cellulosic fibrous material with a pulping liquor containing sodium hydroxide as at least one active pulping chemical,
- separating the pulped material from spent pulping liquor,
- subjecting said pulping liquor to a recovery and regeneration operation including a furnacing step and a causticization step to form a white liquor containing sodium hydroxide, sodium sulphate, sodium chloride and potassium values, said white liquor having a potassium molar ratio (K/K+Na) in the region of 0.14 to 0.25,
- evaporating said white liquor by boiling at a temperature of about 50° to about 120° C. to deposit therefrom a mixture containing sodium carbonate and sodium sulphate until the resulting mother liquor is saturated with respect to sodium chloride, separating said deposited mixture from the resulting mother liquor, recycling at least part of said separated deposited mixture to said furnacing step, evaporating said mother liquor by boiling at a temperature of about 75° to about 120° C. to deposit therefrom sodium chloride substantially uncontaminated with potassium chloride during one portion of a predetermined operating period of said process, separating said deposited sodium chloride from the resulting concentrated white liquor during said one portion of said operating period, evaporating said mother liquor by boiling at a temperature of about 40° to about 75° C. to deposit therefrom potassium chloride during the remaining portion of said selected operating period of said process, separating said deposited potassium chloride from the resulting concentrated white liquor during said remaining portion of said operating period, and recycling at least part of said concentrated white liquor for use in said contacting step, said one portion of said predetermined period being the time necessary to increase the potassium concentration of the mother liquor from an initial molar concentration therein to a molar ratio of K/K+Na of about 0.16 to 0.18 and said remaining portion of said predetermined period being the time necessary to decrease the potassium concentration from said molar concentration to said initial molar concentration.

18. The process of claim 7 wherein said one portion temperature is about 85° to about 110° C. and said remaining portion temperature is about 40° to about 60° C.

19. The process of claim 17 wherein said pulping liquor contains sodium sulphide as an active pulping chemical.

20. The process of claim 17 wherein said potassium chloride is deposited during said evaporation of said mother liquor in admixture with sodium chloride and substantially pure solid potassium chloride is separated from the mixture.

21. A continuous process of pulping cellulosic fibrous material including the steps of:
    contacting said cellulosic fibrous material with a pulping liquor containing sodium hydroxide and sodium sulphide as the active pulping chemicals,
    separating the pulped material from spent pulping liquor,
    furnacing said spent pulping liquor to provide a smelt including sodium sulphide, sodium carbonate and sodium sulphate, said smelt also containing sodium chloride and potassium values introduced from exteriorally of the process,
    forming the smelt into an aqueous solution thereof;
    during one portion of a predetermined operating period of said process subjecting the aqueous smelt solution to the following steps:
    (i) causticizing the majority of the sodium carbonate in said smelt solution to sodium hydroxide to provide a white liquor,
    (ii) evaporating said white liquor by boiling at a temperature of about 50° to about 120° C. to deposit therefrom a mixture of sodium carbonate and sodium sulphate until the resulting mother liquor is substantially saturated with respect to sodium chloride,
    (iii) separating said deposited mixture from the resulting mother liquor,
    (iv) recycling at least part of said separated deposited mixture to said furnacing step,
    (v) evaporating said mother liquor by boiling at a temperature of about 80° to about 110° C. to deposit therefrom sodium chloride substantially uncontaminated with potassium chloride and form a concentrated white liquor, and
    (vi) separating said deposited sodium chloride from said concentrated white liquor; and
    during the remaining portion of said predetermined operating period, subjecting the aqueous smelt solution to the following steps:
    (i) evaporating said smelt solution by boiling at a temperature of about 70° to about 110° C. to deposit therefrom a mixture of sodium carbonate and sodium sulphate until the resulting mother liquor is substantially saturated with respect to potassium chloride,
    (ii) separating said deposited mixture from the resulting mother liquor,
    (iii) forming said separated mixture into an aqueous solution thereof,
    (iv) causticizing at least the majority of the sodium carbonate values of the mixture in the aqueous solution to form a substantially sulphide-free white liquor,
    (v) evaporating said mother liquor by boiling at a temperature of about 40° to about 75° C. to deposit potassium chloride therefrom and to form a concentrated sodium sulphide solution,
    (vi) separating said deposited potassium chloride from said sodium sulphide solution, and
    (vii) mixing said concentrated sodium sulphide solution with said sulphide-free white liquor to form concentrated white liquor,
    said one portion of said predetermined period being the time necessary to increase the potassium concentration of the first-mentioned mother liquor from an initial molar concentration therein to a molar ratio of K/K+Na of about 0.16 to 0.18 and said remaining portion of said predetermined period being the time necessary to decrease the potassium concentration of said second mentioned mother liquor to said initial molar concentration.

22. The process of claim 21, wherein said first-mentioned mother liquor boiling temperature is about 90° to about 110° C.

23. A continuous process of pulping cellulosic fibrous material including the steps of:
    contacting said cellulosic fibrous material with a pulping liquor containing sodium hydroxide as at least one active pulping chemical,
    separating the pulped material from spent pulping liquor,
    subjecting said spent pulping liquor to a recovery and regeneration operation including a furnacing step and a causticization step to form a white liquor containing sodium hydroxide, sodium sulphate, sodium chloride and potassium values, said white liquor having a potassium molar ratio (K/K+Na) in the region of 0.14 to 0.25,
    evaporating said white liquor by boiling the same at a temperature of about 50° to about 120° C. to deposit a mixture containing sodium carbonate and sodium sulphate therefrom until the mother liquor is substantially saturated with respect to sodium chloride, separating said deposited mixture from the resulting mother liquor, recycling at least part of said deposited mixture to said furnacing step, evaporating said mother liquor by boiling at a temperature of about 80° to about 110° C. to deposit therefrom sodium chloride substantially uncontaminated with potassium chloride until said evaporated mother liquor is substantially saturated with respect to potassium chloride, separating said deposited sodium chloride from the resulting concentrated white liquor, cooling said concentrated white liquor from a temperature of about 80° to about 110° C. to a temperature of about 20° to about 50° C. to deposit potassium chloride therefrom, and separating the desposited potassium chloride from the resulting mother liquor.

24. The process of claim 23, wherein said concentrated white liquor is cooled from a temperature of about 90° to about 110° C. to about 20° to about 40° C.

25. The process of claim 23, wherein said potassium chloride is deposited in admixture with sodium carbonate and sodium sulphate and including leaching said mixture at a temperature of about 20° to about 50° C. to dissolve contaminants of said potassium chloride therefrom and leave substantially pure potassium chloride, and recycling the leach liquor to said white liquor.

26. A continuous process of pulping cellulosic fibrous material including the steps of:

contacting said cellulosic fibrous material with a pulping liquor containing sodium hydroxide as at least one active pulping chemical, separating the pulped material from spent pulping liquor, subjecting said spent pulping liquor to a recovery and regeneration operation including a furnacing step and a causticization step to form a white liquor containing sodium hydroxide, sodium suphate, sodium chloride and potassium values, said white liquor having a potassium molar ratio (K/K+Na) in the region of 0.14 to 0.25, evaporating said white liquor by boiling at a temperature of about 50° to about 120° C. to deposit a mixture containing sodium carbonate and sodium sulphate therefrom until the resulting mother liquor is substantially saturated with respect to sodium chloride and/or potassium chloride, separating said deposited mixture from the resulting mother liquor, recycling at least part of said deposited mixture to said furnacing step, evaporating said mother liquor by boiling at a temperature of about 30° to about 110° C. to deposit a mixture of sodium chloride and potassium chloride containing relative proportions of these salts corresponding to the relative proportions of sodium chloride and potassium values present in said white liquor as a result of introduction from exteriorally of the process, separating said mixture of sodium chloride and potassium chloride in admixture with minor quantities of sodium carbonate and sodium sulphate from the resulting concentrated white liquor, leaching said mixture at a temperature of about 75° to about 100° C. to dissolve all said potassium chloride, sodium carbonate sodium sulphate values from the mixture and leave substantially pure solid sodium chloride for recovery, cooling the leach liquor to a temperature in the range of about 30° to about 75° C. to cause deposition of substantially pure potassium chloride for recovery, and recycling the mother liquor to the white liquor.

27. The process of claim 13, wherein said leaching is effected at a temperature of about 90° to about 100° C. and said cooling is effected to a temperature of about 40° to about 60° C.

* * * * *